(12) United States Patent
Nishio et al.

(10) Patent No.: US 9,118,453 B2
(45) Date of Patent: Aug. 25, 2015

(54) BASE STATION AND TRANSMISSION METHOD

(75) Inventors: Akihiko Nishio, Kanagawa (JP); Seigo Nakao, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 52 days.

(21) Appl. No.: 13/635,498

(22) PCT Filed: Mar. 17, 2011

(86) PCT No.: PCT/JP2011/001594
§ 371 (c)(1),
(2), (4) Date: Sep. 17, 2012

(87) PCT Pub. No.: WO2011/114743
PCT Pub. Date: Sep. 22, 2011

(65) Prior Publication Data
US 2013/0003692 A1    Jan. 3, 2013

(30) Foreign Application Priority Data
Mar. 19, 2010   (JP) .................................. 2010-064431

(51) Int. Cl.
*H04L 5/00* (2006.01)
*H04W 88/08* (2009.01)

(52) U.S. Cl.
CPC .............. *H04L 5/0094* (2013.01); *H04L 5/001* (2013.01); *H04L 5/0044* (2013.01); *H04W 88/08* (2013.01)

(58) Field of Classification Search
CPC .......................................................... H04L 5/00
USPC ................................................... 370/329, 330
See application file for complete search history.

(56) References Cited

U.S. PATENT DOCUMENTS

| | | | |
|---|---|---|---|
| 8,441,996 B2* | 5/2013 | Kim et al. ...................... 370/329 |
| 2010/0254329 A1* | 10/2010 | Pan et al. ...................... 370/329 |
| 2010/0296389 A1* | 11/2010 | Khandekar et al. ........... 370/216 |
| 2012/0099453 A1* | 4/2012 | Sagfors et al. ................ 370/252 |
| 2012/0250551 A1* | 10/2012 | Sartori et al. ................. 370/252 |
| 2012/0263134 A1* | 10/2012 | Malladi et al. ................ 370/329 |
| 2013/0064196 A1* | 3/2013 | Gao et al. ...................... 370/329 |
| 2013/0083766 A1* | 4/2013 | Chung et al. .................. 370/329 |

OTHER PUBLICATIONS

"PDCCH blind decoding in LTE-A", CATT, Feb. 26, 2010.*
"PDCCH with cross carrier operation", Panasonic, Jan. 26, 2010.*
3GPP TS 36.211 V8.7.0, "Physical Channels and Modulation (Release 8)," Sep. 2008.

(Continued)

*Primary Examiner* — Anh-Vu Ly
*Assistant Examiner* — Abdullahi Ahmed
(74) *Attorney, Agent, or Firm* — Pearne & Gordon LLP

(57) ABSTRACT

Provided are a base station and a transmission method whereby, even in a case where a cross carrier scheduling is employed, the increase in the number of blind decodings on a PDCCH receiving side can be suppressed without need of signaling of an upper layer at the time of changing PDCCH CC. In the base station (100), a CC setting unit (101) sets, from among a plurality of downstream unit carriers included in a UE CC set, a control channel unit carrier (PDCCH CC) used for transmitting allocation information related to a data transmission resource of each downstream unit carrier included in the UE CC set.

10 Claims, 10 Drawing Sheets

(56) References Cited

OTHER PUBLICATIONS

3GPP TS 36.212 V8.7.0, "Multiplexing and channel coding (Release 8)," Sep. 2008.
3GPP TS 36.213 V8.7.0, "Physical layer procedures (Release 8)," Sep. 2008.
3GPP TSG RAN WG1 meeting, R1-092641, "PDCCH design for Carrier aggregation and Post Rel-8 feature," Jun. 2009.
3GPP TSG RAN WG1 meeting, R1-100041, "Mapping of CIF to component carriers" Jan. 2010.
CATT, "PDCCH blind decoding in LTE-A", 3GPP TSG RAN WG1 meeting #60, R1-100874, Feb. 26, 2010, 1-4 pages.
Panasonic, "PDCCH with cross carrier operation", 3GPP TSG-RAN WG1 Meeting #60, R1-101249, Feb. 26, 2010, 1-5 pages.
International Search Report for PCT/JP2011/001594 dated May 17, 2011.
3GPP TS 36.211 V8.7.0, "Physical Channels and Modulation (Release 8)," May 2009.
3GPP TS 36.212 V8.7.0, "Multiplexing and channel coding (Release 8)," May 2009.
3GPP TS 36.213 V8.7.0, "Physical layer procedures (Release 8)," May 2009.
Panasonic, "PDCCH with cross carrier operation", 3GPP TSG-RAN WG1 Meeting #60, R1-101249, Jan. 22-26, 2010, 1-5 pages.

\* cited by examiner

BASE STATION AND TRANSMISSION METHOD

TECHNICAL FIELD

The present invention relates to a base station and a transmission method.

BACKGROUND ART

3GPP-LTE (3rd Generation Partnership Project Radio Access Network Long Term Evolution, hereinafter, referred to as "LTE") adopts OFDMA (Orthogonal Frequency Division Multiple Access) as a downlink communication scheme and adopts SC-FDMA (Single Carrier Frequency Division Multiple Access) as an uplink communication scheme (e.g., see Non-Patent Literatures 1, 2 and 3).

In LTE, a radio communication base station apparatus (hereinafter abbreviated as "base station") assigns resource blocks (RBs) in a system band to a radio communication terminal apparatus (hereinafter abbreviated as "terminal") for each time unit called "subframe" and thereby performs, communication.

Furthermore, the base station transmits downlink control information (L1/L2 control information) for reporting results of resource assignment to downlink data and uplink data to the terminal. This downlink control information is transmitted to the terminal using a downlink control channel such as a PDCCH (Physical Downlink Control Channel). Here, each PDCCH occupies a resource made up of one or a plurality of consecutive CCEs (Control Channel Elements). In LTE, one of 1, 2, 4 and 8 is selected as the number of CCEs (CCE aggregation level) occupied by the PDCCH according to the number of information bits of downlink control information or a channel state of the terminal. In LTE, a frequency band having a width of a maximum of 20 MHz is supported as a system bandwidth.

Furthermore, when assigning a plurality of terminals to one subframe, the base station simultaneously transmits a plurality of PDCCHs. At this time, the base station includes a CRC bit which is masked (or scrambled) with a destination terminal ID to identify a destination terminal of each PDCCH in the PDCCH and transmits the PDCCH. The terminal demasks (descrambles) CRC bits in a plurality of PDCCHs which are likely to be addressed to the own terminal with the terminal ID of the own terminal and thereby blind-decodes the PDCCHs and detects the PDCCH addressed to its own terminal.

Furthermore, downlink control information transmitted from the base station is called "DCI (Downlink Control Information)" and includes information on resources assigned by the base station to the terminal (resource assignment information) and MCS (Modulation and channel Coding Scheme) or the like. The DCI has a plurality of formats. That is, examples of such formats include uplink format, downlink MIMO (Multiple Input Multiple Output) transmission format, downlink non-contiguous band assignment format. The terminal needs to receive both downlink assignment control information (downlink related assignment control information) and uplink assignment control information (uplink-related assignment control information). The downlink assignment control information has a plurality of formats (downlink assignment control information formats) and the uplink assignment control information has one format (uplink assignment control information format).

For example, for the downlink control information (DCI), formats of a plurality of sizes are defined depending on a transmitting antenna control method and a resource assignment method of the base station or the like. Of the plurality of formats, a format of downlink assignment control information for assigning contiguous bands (hereinafter referred to as "contiguous band assignment downlink format") and a format of uplink assignment control information for assigning contiguous bands (hereinafter simply referred to as "contiguous band assignment uplink format") have the same size. These formats (DCI formats) include type information (e.g., 1-bit flag) indicating a type of assignment control information (downlink assignment control information or uplink assignment control information). Thus, even when the size of the contiguous band assignment downlink format and the size of the contiguous band assignment uplink format are the same, the terminal can identify which of the downlink assignment control information or uplink assignment control information is the assignment control information by checking the type information included in the assignment control information.

For example, the contiguous band assignment uplink format is called "DCI format 0" (hereinafter referred to as "DCI 0"), whereas the contiguous band assignment downlink format is called "DCI format 1A" (hereinafter referred to as "DCI 1A"). As described above, DCI 0 and DCI 1A have the same size and can be distinguished by type information. Thus, DCI 0 and DCI 1A will be collectively described as DCI 0/1A below.

Furthermore, in addition to the contiguous band assignment downlink format and contiguous band assignment uplink format, there are DCI formats such as: a format of downlink assignment control information for performing non-contiguous band assignment ("non-contiguous band assignment downlink format": DCI format 1: DCI 1); and a format of downlink assignment control information for assigning spatially multiplexed MIMO transmission and ("spatially multiplexed MIMO downlink format": DCI format 2, 2A: DCI 2, 2A). Here, DCI 1, 2 or 2A is a format used dependently on a downlink transmission mode of the terminal (non-contiguous band assignment or spatially multiplexed MIMO transmission). That is, DCI 1, 2 or 2A is a format set for each terminal. On the other hand, DCI 0/1A is a format that can be used for a terminal in any transmission mode, independently of the transmission mode. That is, DCI 0/1A is a format used in common to all terminals. Furthermore, when DCI 0/1A is used, 1-antenna transmission or transmission diversity is used as a default transmission mode.

Furthermore, studies are being carried out on a method of limiting CCEs to be blind-decoded for each terminal for the purpose of reducing the number of times blind decoding is performed to reduce the circuit scale of the terminal. This method limits a CCE region that can be blind-decoded by each terminal (hereinafter referred to as "search space"). Here, the unit of a CCE region assigned to each terminal (that is, equivalent to the unit for blind decoding) is called "downlink control information assignment region candidate (PDCCH assignment region candidate)" or "blind decoding region candidate."

In LTE, a search space is set randomly for each terminal. The number of CCEs configuring this search space is defined for each CCE aggregation level of a PDCCH. For example, the number of CCEs configuring a search space is 6, 12, 8, 16 in correspondence with CCE aggregation level 1, 2, 4, 8 of the PDCCH. In this case, the number of blind decoding region candidates is 6 candidates (6=6÷1), 6 candidates (6=12÷2), 2 candidates (2=8÷4), 2 candidates (2=16÷8) in correspondence with CCE aggregation level 1, 2, 4, 8 of the PDCCH. That is, the blind decoding region candidates are limited to a total of 16 candidates. Thus, each terminal needs only to perform blind decoding on a blind decoding region candidate group within a search space assigned to its own terminal, and can thereby reduce the number of times blind decoding is performed. Here, a search space of each terminal is set using a terminal ID of each terminal and a hash function, which is a function that performs randomization. This terminal-specific CCE region is called a specific region (UE specific search space: UE-SS).

On the other hand, the PDCCH also includes control information for assignment of data common to terminals simultaneously reported to a plurality of terminals (e.g., assignment information relating to a downlink broadcast signal and assignment information relating to a paging signal (hereinafter referred to as "control information addressed to a common channel"). To transmit control information addressed to a common channel, a CCE region common to all terminals that should receive a downlink broadcast signal (hereinafter referred to as "common region (common search space: C-SS) ") is used for the PDCCH. In the search space of C-SS, there are a total of 6 blind decoding region candidates; 4 candidates (4=16÷4) and 2 candidates (2=16÷8) for CCE aggregation levels 4 and 8 respectively.

Furthermore, in the UE-SS, the terminal performs blind decoding on DCI formats of two sizes; a first type DCI format (DCI 0/1A) used in common for all terminals and a second type DCI format (DCI 1, 2, 2A or the like) which is dependent on a transmission mode. For example, in the UE-SS, the terminal performs blind decoding on 16 blind decoding region candidates relating to the above-described first type DCI format (DCI 0/1A) and the second type DCI format (DCI 1, 2, 2A or the like) of different sizes respectively and thus performs blind decoding a total of 32 times. Furthermore, in the C-SS, the terminal performs blind decoding on the above-described six blind decoding region candidates for DCI format 1C which is a common channel assignment format (hereinafter referred to as "DCI 1C") and DCI 1A respectively, and thus performs blind decoding a total of 12 times. Therefore, the terminal performs blind decoding a total of 44 times per subframe.

Here, DCI 1A used to assign a common channel and DCI 0/1A used to assign terminal-specific data have the same size, but the two are distinguished from each other by a terminal ID. Therefore, the base station cart also transmit DCI 0/1A to assign terminal-specific data using the C-SS without increasing the number of times the terminal performs blind decoding.

Furthermore, standardization of 3GPP LTE-Advanced (hereinafter referred to as "LTE-A"), which realizes faster communication than LTE has started. LTE-A realizes downlink transmission rate of a maximum of 1 Gbps or above and an uplink transmission rate of a maximum of 500 Mbps or above. Thus, base stations and terminals communicable at a wideband frequency of 40 MHz or above (hereinafter referred to as "LTE-A terminals") are expected to be introduced. Furthermore, an LTE-A system is required to accommodate not only LTE-A terminals but also terminals supporting an LTE system (hereinafter referred to as "LTE terminals").

LTE-A proposes a carrier aggregation scheme that aggregates a plurality of frequency bands for communication to realize wideband communication of 40 MHz or above (e.g., see Non-Patent Literature 1). For example, a frequency band having a width of 20 MHz is considered as a base unit (hereinafter referred to as "component carrier" (CC)) of communication bands. Thus, LTE-A realizes a system bandwidth of 40 MHz by aggregating two component carriers, for example. Furthermore, both an LTE terminal and an LTE-A terminal are accommodated in one component carrier. In the following description, a component carrier in an uplink will be referred to as an "uplink component carrier" and a component carrier in a downlink will be referred to as a "downlink component carrier."

In LTE-A, studies are being carried out on supporting carrier aggregation using at least five CCs as the system, but the number of CCs actually used differs from one terminal to another depending on a reception capability corresponding to the number of CCs and a required transmission rate of each terminal. Thus, which CC is used is set (configured) for each terminal. A set CC is called "UE CC set." Furthermore, the UE CC set is semi-statically controlled by a required transmission rate of the terminal.

in LTE-A, when data is assigned to a plurality of component carriers for a certain terminal, assignment control information is reported using a plurality of PDCCHs. That is, a result of resource assignment of each component carrier is reported using one PDCCH per one component carrier. Here, as a method of reporting resource assignment information of each component carrier from a base station to a terminal, assigning data of a different component carrier using a PDCCH transmitted by a certain component carrier, i.e., "cross-carrier scheduling" is under study in LTE-A. To be more specific, studies are being carried out on instructing a component carrier to which the PDCCH is assigned using a carrier indicator (CI) in the PDCCH. That is, each component carrier is labeled by the CI. The CI is transmitted in a field in the PDCCH called "CIF (Carrier Indicator Field)" (e.g., see Non-Patent Literature 5).

Furthermore, LTE-A will newly introduce a transmission method using non-contiguous band assignment and a transmission method using MIMO as uplink transmission methods. Along with this, a definition of new DCI formats (e.g., DCI formats 0A, 0B: DCI 0A, 0B) is under study (e.g., see Non-Patent Literature 4). That is, DCI 0A, 0B is a DCI format which is dependent on an uplink transmission mode. In this case, in addition to the above-described blind decoding of LTE, 16 times of blind decoding are further added in the UE-SS and the terminal performs blind decoding a total of 60 times per subframe.

CITATION LIST

Non-Patent Literatures

NPL 1
3GPP TS 36.211 V8.7.0, "Physical Channels and Modulation (Release 8)," September 2008
NPL 2
3GPP TS 36.212 V8.7.0, "Multiplexing and channel coding (Release 8)." September 2008
NPL 3
3GPP TS 36.213 V8.7.0, "Physical layer procedures (Release 8)," September 2008
NPL 4
3GPP TSG RAN WG1 meeting, R1-092641, "PDCCH design for Carrier aggregation and Post. Rel-8 feature," June 2009
NPL 5
3GPP TSG RAN WG1 meeting, R1-100041, "Mapping of CIF to component carriers" January, 2010

SUMMARY OF INVENTION

Technical Problem

Regarding the above-described cross-carrier scheduling, the following two methods are under study.

The first method is a method that associates a component carrier for transmitting data with a component carrier for transmitting a PDCCH relating to resource assignment used for data transmission through the component carrier (hereinafter, may be referred to as "PDCCH CC") in a one-to-one correspondence. Here, the information relating to a PDCCH CC (that is, information relating to from which component carrier a PDCCH for a component carrier to transmit data is transmitted) is set by a higher layer (that is, RRC signaling).

When this first method is adopted, the terminal needs only to perform blind decoding the same number of times as the number of component carriers used for data transmission. That is, the terminal needs only to perform blind decoding the number of times corresponding to the above-described 60 times multiplied by the number of component carriers used for data transmission.

However, as shown in FIG. 1, signaling of a higher layer (RRC) is necessary when the PDCCH CC is changed. That is, it is necessary to change, for example, the configuration of component carriers for transmitting a PDCCH from configuration 1 to configuration 2 in FIG. 1 through RRC signaling. This increases the overhead and delay in transmission/reception of a message in the higher layer.

On the other hand, as shown in FIG. 2, the second method is a method that assumes a PDCCH CC of an optional component carrier as all component carriers including the optional component carrier (or some (two or more) of a plurality of component carriers). When this second method is adopted, the terminal needs to perform blind decoding the number of times corresponding to the above-described 60 times multiplied by the number of component carriers used for data transmission and the number of PDCCH CCs respectively. Here, when the DCI size of each component carrier (that is, the number of control information hits) is the same, the terminal can detect PDCCHs of a plurality of component carriers by performing blind decoding one time for an optional component carrier. However, in the worst case where DCI sizes of all component carriers are different from each other, the terminal needs to perform blind decoding the number of times corresponding to the above-described 60 times multiplied by the number of component carriers used for data transmission and the number of PDCCH CCs. That is, the number of times blind decoding is performed increases and the terminal configuration becomes more complicated.

It is an object of the present invention to provide a base station and a transmission method capable of suppressing increase in the number of times blind decoding is performed on the receiving side of a PDCCH without the need for signaling of a higher layer when changing a PDCCH CC, even in a case where cross-carrier scheduling is adopted.

Solution to Problem

A base station according to an aspect of the present invention transmits data to a terminal, using a plurality of downlink component carriers, the base station including: component carrier setting section that sets the plurality of downlink component carriers for the terminal and sets a control channel component carrier for transmitting assignment information relating to data transmission resources of each downlink component carrier from among the plurality of downlink component carriers, associates one of the control channel component carriers with a first downlink component carrier among the plurality of downlink component carriers and associates a plurality of the control channel component carriers with a second downlink component carrier; and a transmitting section that transmits the data and the assignment information, using the plurality of downlink component carriers and control channel component carriers set by the component carrier setting section.

A transmission method according to an aspect of the present invention is a transmission method for transmitting data to a terminal, using a plurality of downlink component carriers, the method including the steps of: setting the plurality of downlink component carriers for the terminal and setting a control channel component carrier for transmitting assignment information relating to data transmission resources of each downlink component carrier from among the plurality of downlink component carriers, associating one of the control channel component carriers with a first downlink component carrier among the plurality of downlink component carriers and associating a plurality of the control channel component carriers with a second downlink component carrier; and transmitting the data and the assignment information using the set plurality of downlink component carriers and control channel component carriers.

Advantageous Effects of Invention

According to the present invention, it is possible to provide a base station and a transmission method capable of suppressing increase in the number of times blind decoding is performed on the receiving side of a PDCCH without the need for signaling of a higher layer when changing a PDCCH CC, even in a case where cross-carrier scheduling is adopted.

DESCRIPTION OF EMBODIMENTS

Figure 1:
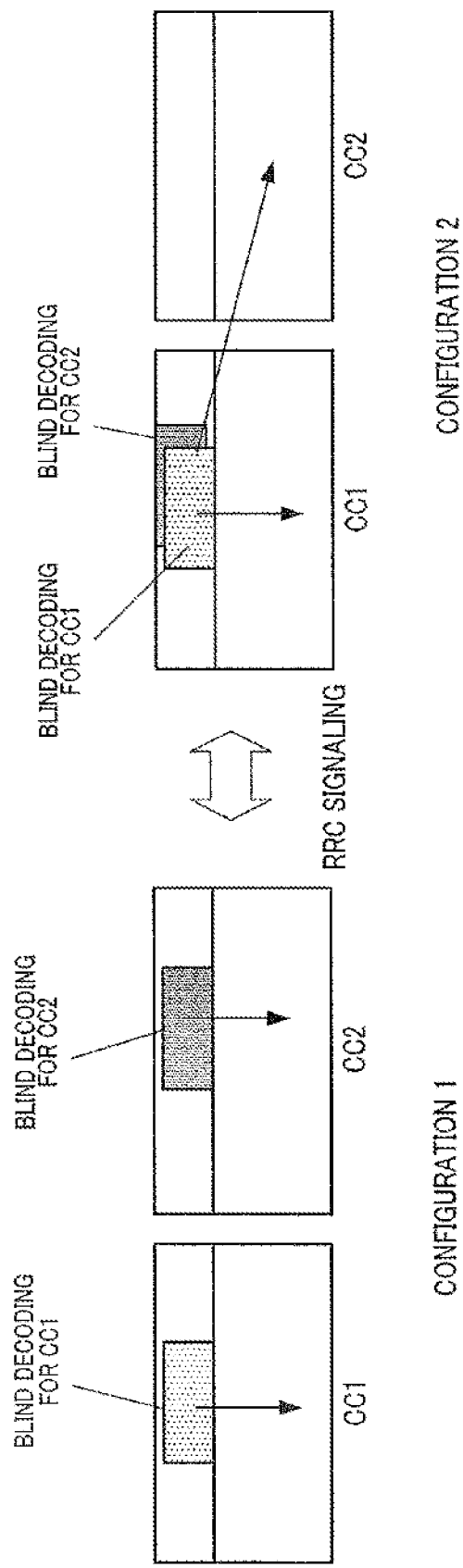
FIG. 1 is a diagram illustrating cross-carrier scheduling.
Figure 2:
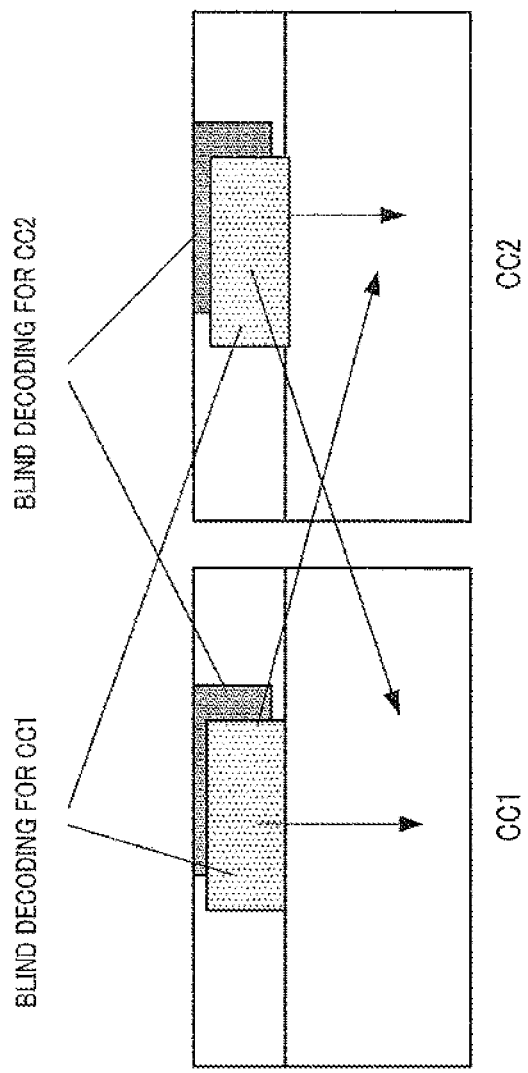
FIG. 2 is a diagram illustrating cross-carrier scheduling.

Hereinafter, embodiments of the present invention will be described in detail with reference to the accompanying drawings. Identical components among the embodiments will be assigned the same reference numerals and overlapping description thereof will be omitted.

The following description will be given on the assumption of the following points. That is, DCI 1C, 1A is used as a DCI format for common channel assignment. Furthermore, DCI 0/1A is used as a DCI format for data assignment commonly used for all terminals (that is, usable for a terminal in any transmission mode independently of a transmission mode).

This DCI 0/1A is a DCI format for data assignment in a default transmission mode. Furthermore, DCI 0A, 0B is used as a DCI format for data assignment dependent on an uplink transmission mode. Furthermore, DCI 1, 2, 2A is used as a DCI format for data assignment dependent on a downlink transmission mode. Furthermore, adding a CI (Carrier indicator) to a PDCCH, that is, labeling the PDCCH with the CI makes possible a report relating to data assignment of a component carrier different from an optional component carrier from the optional component carrier. However, a PDCCH signal transmitted using a C-SS needs to have the same format as that of a PDCCH to which a common channel is assigned. For this reason, with the C-SS, a PDCCH signal not including the CI is transmitted. That is, according to the PDCCH signal transmitted with the C-SS, it is possible to make a report only relating to resource assignment of data transmission in a component carrier whereby this PDCCH signal is transmitted.

[Embodiment 1]
[Configuration of Base Station 100]

Figure 3:
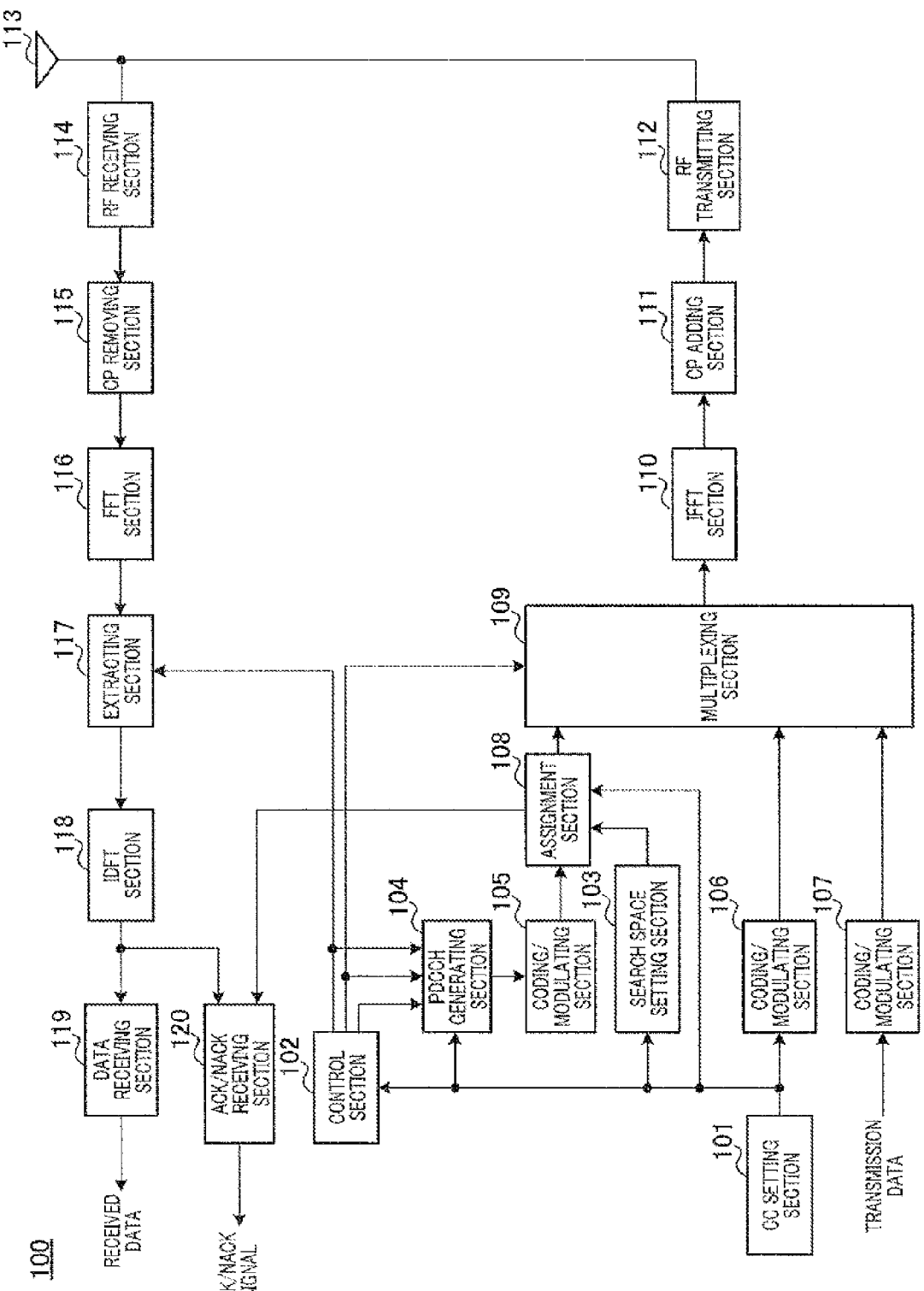
FIG. 3 is a block diagram illustrating a configuration of a base station according to Embodiment 1 of the present invention.

FIG. 3 is a block diagram illustrating a configuration of base station 100 according to Embodiment 1 of the present invention. In FIG. 3, base station 100 includes CC setting section 101, control section 102, search space setting section 103, PDCCH generating section 104, coding/modulating sections 105, 106 and 107, assignment section 108, multiplexing section 109, IFFT (inverse Fast Fourier Transform) section 110, CP (Cyclic Prefix) adding section 111, RF transmitting section 112, antenna 113, RF receiving section 114, CP removing section 115, FFT (Fast Fourier Transform) section 116, extracting section 117, IDFT (Inverse Discrete Fourier transform) section 118, data receiving section 119 and ACK/NACK receiving section 120.

CC setting section 101 sets (configures) one or a plurality of component carriers used for an uplink and downlink per terminal, that is, sets a UE CC set. To be more specific, downlink component carriers and uplink component carriers are associated with each other beforehand. Therefore, when downlink component carriers are determined, uplink component carriers are automatically determined. CC setting section 101 can thereby set a UE CC set only by setting downlink component carriers. This UE CC set is set according to, for example, a required transmission rate of each terminal, amount of data to be transmitted in a transmission buffer, allowable amount of delay, QoS (Quality of Service) or the like.

Furthermore, CC setting section 101 sets one or a plurality of "PDCCH CCs" for each set downlink component carrier. This "PDCCH CC" means a component carrier that cart transmit a PDCCH relating to resource assignment used for data transmission in an optional component carrier as described above.

Criteria for selecting a PDCCH CC are, for example, as follows.

(1) A component carrier in a good average channel situation over a long time (e.g., component carrier with small channel attenuation (pathloss) is selected.

(2) A component carrier having a higher SIR is selected.

(3) A component carrier having higher transmission power or receiving power is selected.

(4) A component carrier that receives smaller other cell interference is selected.

(5) in a heterogeneous network environment constructed of a macro cell and a pico cell/femto cell or the like, when a first component carrier having large transmission power for interference control (that is, component carrier having greater coverage) and a second component carrier having smaller transmission power for interference control (that is, component carrier having smaller coverage) are used, for the first component carrier, the first component carrier itself is selected as the only PDCCH CC and for the second component carrier, the second component carrier itself and a component carrier having greater transmission power are selected as PDCCH CCs.

Above selection criteria (1) to (5) of PDCCH CCs may be used singly or in any combination thereof. Furthermore, component carriers not set as component carriers to be received by the terminal (that is, component carriers not included in the UE CC set) are not to be selected for the PDCCH CCs. This makes it possible to reduce the number of component carriers to be received by the terminal.

Furthermore, CC setting section 101 sets a transmission mode of each downlink component carrier and a transmission mode of each uplink component carrier in communication with the setting target terminal based on the transmission/reception capability (UE capability) of the setting target terminal or the propagation path condition. The setting of the transmission mode is performed for each setting target terminal. Examples of this transmission mode include a transmission mode using spatially multiplexed MIMO, beam forming transmission mode, and transmission mode using non-contiguous band assignment.

CC setting section 101 then includes information relating to the set UE CC set, information relating to PDCCH CC of each downlink component carrier included in the UE CC set and information relating to a transmission mode of each component carrier in the setting information and outputs the setting information to control section 102, search space setting section 103, PDCCH generating section 104, coding/modulating section 106 and assignment section 108. This setting information is reported to each terminal via coding/modulating section 106 as control information of a higher layer (RRC control information).

Control section 102 generates assignment control information according to the setting information received from CC setting section 101.

To be more specific, when only one downlink component carrier is set for a terminal for which assignment control information is generated (that is, only one downlink component carrier is included in the UE CC set), control section 102 generates assignment control information including MCS information for a transport block to be transmitted, resource (RB) assignment information and HARQ information for the terminal. On the other hand, when a plurality of downlink component carriers are set for the terminal for which assignment control information is generated (that is, when a plurality of downlink component carriers are included in the UE CC set), control section 102 generates assignment control information including MCS information for a transport block to be transmitted, resources (RB) assignment information, HARQ information and CI (Carrier Indicator) indicating a CC number for the terminal. In this case, assignment control information is generated for each downlink or uplink component carrier. Here, the resource assignment information generated by control section 102 includes uplink resource assignment information indicating uplink resources to which uplink data of the terminal is assigned (e.g., PDSCH (Physical Uplink Shared Channel)) and downlink resource assignment information indicating downlink resources to which downlink data addressed to the terminal is assigned (e.g., PDSCH (Physical Downlink Shared Channel)). Furthermore, the size of the assignment control information (that is, the number of bits) differs depending on the bandwidth of a component carrier to which resources are assigned according to the assignment control information (that is, assignment target component carrier) and the transmission mode set in the component carrier.

Here, control section 102 generates assignment control information using a format according to the transmission mode set in the assignment target component carrier. That is, control section 102 generates assignment control information using a DCI format (DCI 0A, 0B) according to an uplink transmission mode of the terminal, a DCI format (DCI 1, 2 or 2A) according to the downlink transmission mode or DCI format (DCI 0/1A) common to all terminals.

For example, during normal data transmission, control section 102 generates assignment control information using a format (DCI 1, 2, 2A, 2B, 0A, 0B) according to a transmission mode of each terminal. This allows data transmission to be performed in a transmission mode set for each terminal, and can thereby improve throughput.

However, a drastic change in a propagation, path condition or a change in interference, from a neighboring cell or the like causes a situation in which reception errors frequently occur in the transmission mode set for each terminal. In this case, control section 102 generates assignment control information using a format (DCI 0/1A) common to all terminals. That is, control section 102 generates assignment control information using a format in a default transmission mode. This enables more robust transmission.

Furthermore, when the propagation path condition turns for the worse, control section 102 generates assignment control information (DCI 0/1A) common to all terminals also when transmitting control information (RRC signaling) of a higher layer to report the change in the transmission mode. Here, the number of information bits of DCI 0/1A common to all terminals is smaller than the number of information bits of DCI 1, 2, 2A, 0A, 0B dependent on the transmission mode. Thus, when the same number of CCEs is set, DCI 0/1A allows data to be transmitted at a lower coding rate than DCI 1, 2, 2A, 0A, 0B. Thus, control section 102 uses DCI 0/1A when the propagation path condition turns for the worse, thereby allowing even a terminal in a poor propagation path condition to receive data at a good error rate.

Furthermore, control section 102 generates, in addition to assignment control information for terminal-specific data assignment, assignment control information for a common channel (e.g., DCI 1C, 1A) for data assignment common to a plurality of terminals such as broadcast information and paging information.

Of the generated assignment control information for terminal-specific data assignment, control section 102 outputs MCS information and HARQ information to PDCCH generating section 104, outputs uplink resource assignment information to PDCCH generating section 104 and extracting section 117 and outputs downlink resource assignment information to PDCCH generating section 104 and multiplexing section 109. Furthermore, control section 102 outputs the generated assignment control information for a common channel to PDCCH generating section 104.

Search space setting section 103 sets to common search space (C-SS) and a specific search space (UE-SS). As described above, the common search space (C-SS) is a search space common to all terminals and the specific search space (UE-SS) is a search space specific to each terminal.

To be more specific, search space setting section 103 sets a predetermined CCE (e.g., a 16th CCE from the top CCE) as a C-SS. The CCE is a base unit.

On the other hand, search space setting section 103 sets a UE-SS for each terminal. Search space setting section 103 calculates a UE-SS of a certain terminal from a terminal ID of the terminal, a CCE number calculated using a hash function that performs randomization and the number of CCEs (L) constituting a search space.

Figure 4:
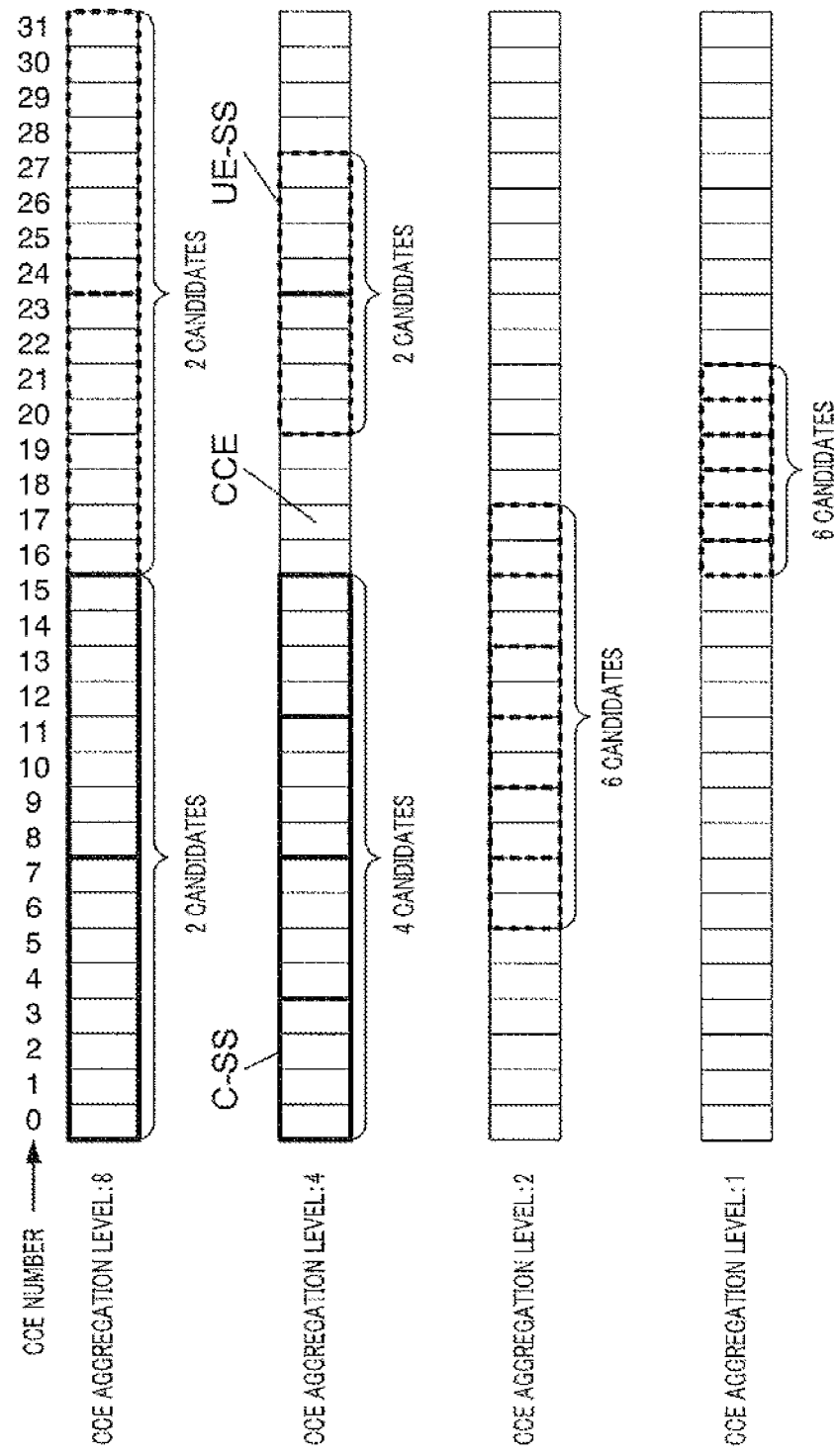
FIG. 4 is a diagram illustrating an example of setting C-SS and UE-SS for a certain terminal.

FIG. 4 is a diagram illustrating an example of setting a C-SS and a UE-SS for a certain terminal.

In FIG. 4, four PDCCH assignment region candidates (that is, CCE0 to 3, CCE4 to 7, CCE8 to 11, CCE12 to 15) are set as a C-SS for CCE aggregation level 4 of PDCCH. Furthermore, two PDCCH assignment region candidates (that is, CCE0 to 7, CCE8 to 15) are set as a C-SS for CCE aggregation level 8 of PDCCH. That is, in FIG. 4, a total of six PDCCH assignment region candidates are set as C-SSs.

Furthermore, in FIG. 4, six PDCCH assignment region candidates (that is, each of CCE16 to 21) are set as a UE-SS for CCE aggregation level 1. Furthermore, six PDCCH assignment region candidates (that is, CCE6 to 17 divided into sets of 2) are set as a UE-SS for CCE aggregation level 2. Furthermore, two PDCCH assignment region, candidates (that is, CCE20 to 23, CCE24 to 27) are set as a UE-SS for CCE aggregation level 4. Furthermore, two PDCCH assignment region candidates (that is, CCE16 to 23, CCE24 to 31) are set as a UE-SS for CCE aggregation level 8. That is, in FIG. 4, a total of 16 PDCCH assignment region candidates are set as UE-SSs.

For an LTE-A terminal for which a plurality of component carriers are set, search space setting section 103 sets UE-SSs for respective set component carriers. Search space setting section 103 then outputs search space information indicating the set UE-SSs of each terminal to assignment section 108.

Returning to FIG. 3, PDCCH generating section 104 generates a PDCCH signal including assignment control information for terminal-specific data assignment received from control section 102 (that is, uplink resource assignment information, downlink resource assignment information, MCS information and HARQ information or the like for each terminal) or a PDCCH signal including assignment control information for a common channel (that is, broadcast information and paging information or the like common to terminals). At this time, PDCCH generating section 104 adds a CRC bit to uplink assignment control information and downlink assignment control information generated for each terminal and further masks (or scrambles) the CRC bit with a terminal ID. PDCCH generating section 104 then outputs the masked PDCCH signal to coding/modulating section 105.

Coding/modulating section 105 channel-codes and then modulates the PDCCH signal received from PDCCH generating section 104 and outputs the modulated PDCCH signal to assignment section 108. Here, coding/modulating section 105 sets a coding rate so that each terminal can obtain sufficient receiving quality based on channel quality information (CQI: channel quality indicator) reported from each terminal. For example, coding/modulating section 105 sets a lower coding rate for a terminal located closer to a cell boundary (that is, a terminal having lower channel quality).

Assignment section 108 assigns PDCCH signals including assignment control information for a common channel received from coding/modulating section 105 and PDCCH signals including assignment control information for terminal-specific data assignment for each terminal to CCEs in C-SSs or CCEs in UE-SSs for each terminal indicated by the search space information received from search space setting section 103 respectively. For example, assignment section 108 selects one PDCCH assignment region candidate from among a group of PDCCH assignment region candidates in a C-SS (e.g., FIG. 4). Assignment section 108 then assigns a PDCCH signal including assignment control information for a common channel to CCEs the selected PDCCH assignment region candidate.

Furthermore, assignment section 108 maps the PDCCH signal including assignment control information based on mapping rules according to the type of a component carrier to which resources are assigned according to the assignment control information and the type of a format of the assignment control information. Here, the type of a component carrier means whether the component carrier is a first type component carrier associated with one PDCCH CC or a second type component carrier associated with a plurality of PDCCH CCs. This decision relating to the type of a component carrier is made based on the setting information received from CC setting section 101.

To be more specific, the above-described mapping rules are as follows.

(1) In a case where a target component carrier to which resources are assigned according to assignment control information for terminal-specific data assignment included in a mapping target PDCCH signal is a first type component carrier and the format of the assignment control information is a transmission mode dependent DCI format (e.g., DCI 1, 2, 2A, 0A, 0B): a PDCCH signal is mapped to a UE-SS set for an assignment target, terminal in a PDCCH CC set for the target component carrier.

(2) In a case where a target component carrier to which resources are assigned according to assignment control information for terminal-specific data assignment included in a mapping target PDCCH signal is a first type component carrier and the format of the assignment control information is a format common to all terminals (e.g., DCI 0/1A): PDCCH signal is mapped to a C-SS of the target component carrier or a UE-SS set for an assignment target terminal in a PDCCH CC set for the target component carrier. A PDCCH signal not including CIF is assigned to the C-SS. That is, according to the PDCCH signal transmitted with the C-SS, only the assignment relating to component carriers including the CSS is possible.

(3) In a case where a target component carrier to which resources are assigned according to assignment control information for terminal-specific data assignment included in a mapping target PDCCH signal is a second type component carrier and the format is a transmission mode dependent DCI format (e.g., DCI 1, 2, 2A, 0A, 0B): a PDCCH signal is mapped to a UE-SS set for an assignment target terminal in the target component carrier.

(4) in a case where a target component carrier to which resources are assigned according to assignment control information for terminal-specific data assignment included in a mapping target PDCCH signal is a second type component carrier and the format is a format common to all terminals (e.g., DCI 0/1A): of the plurality of PDCCH CCs set for the target component carrier, a PDCCH signal is mapped to a UE-SS set for the assignment target terminal in a PDCCH CC different from the target component carrier or any one C-SS of the plurality of PDCCH CCs.

Here, the CCE aggregation level of one PDCCH signal differs depending on the coding rate and the number of bits of the PDCCH signal (that is, amount of information of assignment control information). For example, since the coding rate of a PDCCH signal addressed to a terminal located near a cell boundary is set to be low, more physical resources are required. Therefore, assignment section 108 assigns the PDCCH signal addressed to the terminal located near the cell boundary to more CCEs.

Assignment section 108 outputs the PDCCH signal assigned to the CCEs to multiplexing section 109. Furthermore, assignment section 108 outputs information indicating the CCEs to which the PDCCH signal is assigned to ACK/NACK receiving section 120. Details of CCE assignment processing in assignment section 108 will be described later.

Coding/modulating section 106 channel-codes and then modulates the setting information received from CC setting section 101 and outputs the modulated setting information to multiplexing section 109.

Coding/modulating section 107 channel-codes and then modulates the inputted transmission data (downlink data) and outputs the modulated transmission data signal to multiplexing section 109.

In each CC, multiplexing section 109 multiplexes the PDCCH signal received from assignment section 108, the setting information received from coding/modulating section 106, and the data signal (that is, PDSCH signal) inputted from coding/modulating section 107. Here, multiplexing section 109 maps the PDCCH signal and the data signal (PDSCH signal) based on the downlink resource assignment information received from control section 102. Multiplexing section 109 may map the setting information to a PDSCH. Multiplexing section 109 then outputs the multiplexed signal to IFFT section 110.

IFFT section 110 transforms the multiplexed signal from multiplexing section 109 into a time waveform and CP adding section 111 adds a CF to this time waveform and thereby obtains an OFDM signal.

RF transmitting section 112 applies transmission radio processing (up-conversion, digital/analog (D/A) conversion or the like) to the OFDM signal inputted from CP adding section 111 and transmits the OFDM signal via antenna 113.

On the other hand, RF receiving section 114 applies reception radio processing (down-conversion, analog/digital (A/D) conversion or the like) to the received radio signal received in a reception band via antenna 113 and outputs the received signal obtained to CF removing section 115.

CP removing section 115 removes a CF from the received signal and FFT (Fast Fourier Transform) section 116 transforms the received signal after CP removal into a frequency domain signal.

Extracting section 117 extracts uplink data from the frequency domain signal received from FFT section 116 based on uplink resource assignment information received from control section 102, IDFT section 118 then transforms the extracted signal into a time domain signal and outputs the time domain signal to data receiving section 119 and ACK/NACK receiving section 120.

Data receiving section 119 decodes the time domain signal inputted from IDFT section 118. Data receiving section 119 then outputs the decoded uplink data as received data.

ACK/NACK receiving section 120 extracts an ACK/NACK signal from each terminal corresponding to downlink data (PDSCH signal) out of the time domain signal received from IDFT section 118. To be more specific, ACK/NACK receiving section 120 extracts the ACK/NACK signal from the uplink control channel (e.g., PDCCH (physical uplink control channel)) based on the information received from assignment section 108. Furthermore, the uplink control channel is an uplink control channel associated with CCEs assigned to the downlink data.

ACK/NACK receiving section 120 makes an ACK/NACK decision on the extracted ACK/NACK signal.

Here, the reason that CCEs and PUCCH are associated with each other is to eliminate the need for signaling for the base station to report the PUCCH used for the terminal to transmit an ACK/NACK signal to each terminal. This makes it possible to efficiently use downlink communication resources. Therefore, each terminal decides a PUCCH used to transmit an ACK/NACK signal based on CCEs to which control information (PDCCH signal) for its own terminal is mapped according to this association. Here, when base station 100 assigns a PDCCH signal including downlink resource assignment information of a plurality of downlink component carriers to CCEs of a plurality of downlink component carriers, ACK/NACK receiving section 120 extracts an ACK/NACK signal from the PUCCH associated with the CCE number of each CCE.

[Configuration of Terminal 200]

Figure 5:
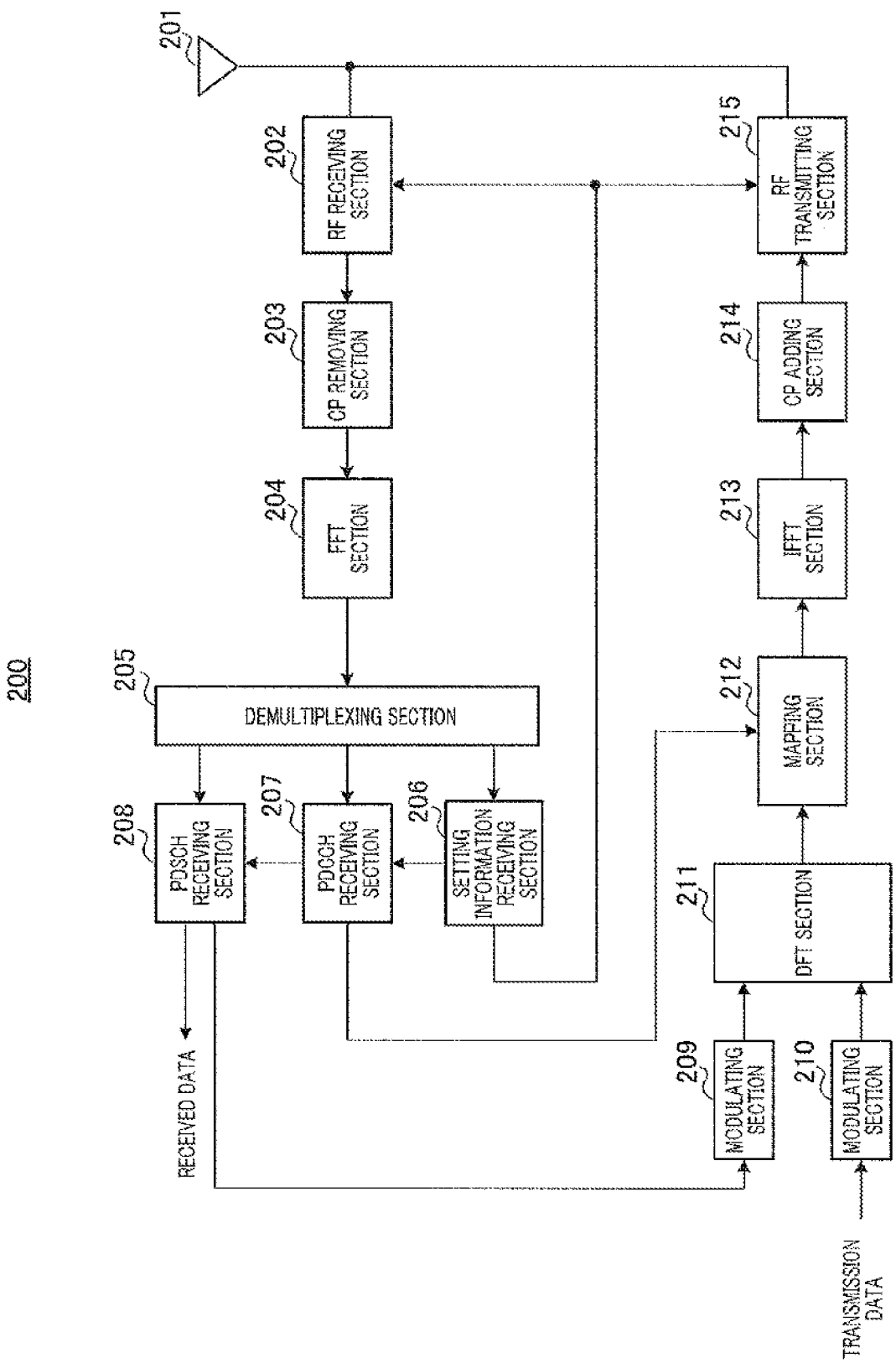
FIG. 5 is a block diagram illustrating a configuration of a terminal according to Embodiment 1 of the present invention.

FIG. 5 is a block diagram illustrating a configuration of terminal 200 according to Embodiment 1 of the present invention. Here, terminal 200 is an LTE-A terminal and receives a data signal (downlink data) using a plurality of downlink component carriers and transmits an ACK/NACK signal for the data signal to base station 100 using a PUCCH of one uplink component carrier.

In FIG. 5, terminal 200 includes antenna 201, RF receiving section 202, CP removing section 203, FFT section 204, demultiplexing section 205, setting information receiving section 206, PDCCH receiving section 207, PDSCH receiving section 208, modulating sections 209 and 210, DFT section 211, mapping section 212, IFFT section 213, CP adding section 214, and RF transmitting section 215.

RF receiving section 202 sets a reception band based on band information received from setting information receiving section 206. RF receiving section 202 applies reception radio processing (down-conversion, analog/digital (A/D) conversion or the like) to a radio signal (here, an OFDM signal) received in a reception band via antenna 201 and outputs the received signal obtained to CP removing section 203. The received signal includes a PDSCH signal, PDCCH signal and control information of a higher layer including setting information. Furthermore, a PDCCH signal (assignment control information) is assigned to a common search space (C-SS) set for each component carrier for terminal 200 and other terminals or a specific search space.

(UE-SS) set for each component carrier for terminal 200.

CP removing section 203 removes a CP from the received signal. FFT section 204 transforms the received signal after CP removal into a frequency domain signal. This frequency domain signal is outputted to demultiplexing section 205.

Demultiplexing section 205 demultipexes the signal received from FFT section 204 into a control signal of a higher layer including setting information (e.g., RRC signaling or the like), a PDCCH signal and a data signal (that is, PDSCH signal). Demultiplexing section 205 outputs the control signal to setting information receiving section 206, outputs the PDCCH signal to PDCCH receiving section 207 and outputs the PDSCH signal to PDSCH receiving section 208. When the control signal of the higher layer including setting information is transmitted via a PDSCH, demultiplexing section 205 extracts the setting information from the signal after being received by PDSCH receiving section 208.

Setting information receiving section 206 reads the following information from the control signal received from demultiplexing section 205. That is, this read information is information indicating an uplink component carrier and a downlink component carrier set in its own terminal, information indicating the terminal ID set in its own terminal, information indicating a PDCCH CC for each component carrier set in its own terminal and information indicating the transmission mode set in its own terminal.

The information indicating the uplink component carrier and downlink component carrier set in its own terminal is outputted to PDCCH receiving section 207, RF receiving section 202 and RF transmitting section 215 as band information. On the other hand, the information indicating the terminal ID set in its own terminal is outputted to PDCCH receiving section 207 as terminal ID information. Furthermore, the information indicating the PDCCH CC for each component carrier set in its own terminal is outputted to PDCCH receiving section 207 as PDCCH CC information. On the other hand, the information indicating the transmission mode set in its own terminal is outputted to PDCCH receiving section 207 as transmission mode information.

PDCCH receiving section 207 performs blind decoding (monitoring) on the PDCCH signal inputted from demultiplexing section 205 and obtains a PDCCH signal addressed to its own terminal. Here, PDCCH receiving section 207 performs blind decoding on a DCI format (e.g., DCI 0/1A) for data assignment common to all terminals, a transmission mode dependent DCI format (e.g. DCI 1, 2, 2A, 0A, 0B) set in its own terminal and a DCI format (e.g., DCI 1C, 1A) for common channel assignment common to all terminals. This makes it possible to obtain a PDCCH signal including assignment control information in each DCI format.

To be more specific, PDCCH receiving section 207 performs the following blind decoding processing in a downlink component carrier unit (that is, data assignment target component carrier unit) included in a UE CC set configured in its own terminal.

(1) PDCCH receiving section 207 first performs blind decoding on C-SSs of PDCCH CC (one or a plurality of PDCCH CCs) indicated by the PDCCH CC information received from setting information receiving section 206 for blind decoding target downlink component carriers, in a DCI format DCI 1C, 1A) for common channel assignment and a DCI format (DCI 0/1A) for data assignment common to all terminals. That is, PDCCH receiving section 207 performs demodulation and decoding on each blind decoding region candidate in the C-SS (that is, candidates in the CCE region assigned to terminal 200) for the size of the DCI format for common channel assignment and the size of the DCI format for data assignment common to all terminals as targets. A CRC bit is demasked with an ID common to a plurality of terminals for the decoded PDCCH signal. PDCCH receiving section 207 then decides a PDCCH signal for which the demasking result shows CRC=OK (no error) as a PDCCH signal including assignment control information for a common channel. Furthermore, PDCCH receiving section 207 demasks the CRC bit for the decoded PDCCH signal with the terminal ID of its own terminal indicated by the terminal ID information. PDCCH receiving section 207 then decides the PDCCH signal for which the demasking result shows CRC=OK (no error) as a PDCCH signal including assignment control information for data assignment common to all terminals. That is, PDCCH receiving section 207 distinguishes whether assignment control information of DCI 0/1A in the C-SS is for a common channel or for data assignment based on the terminal ID (ID common to a plurality of terminals or terminal II) of terminal 200).

(2) When there is one PDCCH CC corresponding to a blind decoding target downlink component carrier (that is the blind decoding target downlink component carrier is a first type component carrier), PDCCH receiving section 207 calculates a UE-SS of its own terminal for each CCE aggregation level using the terminal ID of its own terminal indicated by the terminal ID information received from setting information receiving section 206. PDCCH receiving section 207 then performs demodulation and decoding on each blind decoding region candidate in the calculated UE-SS, for the size of the DCI format corresponding to the transmission mode set in its own terminal (transmission mode indicated by transmission mode information) and the size of the DCI format common to all terminals (DCI 0/1A) as targets. PDCCH receiving section 207 then demasks the CRC hit with the terminal ID of its own terminal for the decoded PDCCH signal. PDCCH receiving section 207 then decides the PDCCH signal for which the demasking result shows CRC=OK (no error) as a PDCCH signal addressed to its own terminal.

(3) When there are a plurality of PDCCH CCs corresponding to the blind decoding target downlink component carrier (that is when the blind decoding target downlink component carrier is a second type component carrier), PDCCH receiving section 207 calculates the UE-SS of its own terminal for each CCE aggregation level using the terminal ID of its own terminal indicated by the terminal ID information received from setting information receiving section 206 for each PDCCH CC. PDCCH receiving section 207 then performs demodulation and decoding on each blind decoding region candidate in the calculated UE-SS, for only the size of the DCI format corresponding to the transmission mode set in its own terminal as a target in the blind decoding target downlink component carrier of the plurality of PDCCH CCs. Furthermore, PDCCH receiving section 207 performs demodulation and decoding on each blind decoding region candidate in the calculated UE-SS, for only the size of the DCI format (DCI 0/1A) common to all terminals as a target in a PDCCH CC different from the blind decoding target downlink component carrier of the plurality of PDCCH CCs. That is, PDCCH receiving section 207 performs blind decoding for only the size of the DCI format (DCI 0/1A) common to all terminals in a C-SS of each PDCCH CC and a UE-SS set in its own terminal using a downlink component carrier different from the blind decoding target downlink component carrier for the blind decoding target downlink component carrier in which a plurality of PDCCH. CCs are set. Furthermore, PDCCH receiving section 207 performs blind decoding on only the size of the DCI format corresponding to the transmission mode set in its own terminal in the UE-SS set in its own terminal using the blind decoding target downlink component carrier in which a plurality of PDCCH CCs are set. PDCCH receiving section 207 then demasks the CRC bit with the terminal it) of its own terminal for the decoded PDCCH signal. PDCCH receiving section 207 then decides a PDCCH signal for which the demasking result shows CRC=OK (no error) as a PDCCH signal addressed to its own terminal.

PDCCH receiving section 207 then outputs downlink resource assignment information included in a PDCCH signal addressed to its own terminal to PDSCH receiving section 208 and outputs uplink resource assignment information to mapping section 212. Furthermore, PDCCH receiving section 207 outputs a CCE number of a CCE in which a PDCCH signal addressed to its own terminal is detected (CCE corresponding to CRC=OK) (CCE number of the top CCE when CCE aggregation level is plural) to mapping section 212. Details of the blind decoding (monitoring) processing in PDCCH receiving section 207 will be described later.

PDSCH receiving section 208 extracts received data (downlink data) from the PDSCH signal received from demultiplexing section 205 based on the downlink resource assignment information received from PDCCH receiving section 207. Furthermore, PDSCH receiving section 208 performs error detection on the extracted received data (downlink data). PDSCH receiving section 208 generates a NACK signal as an ACK/NACK signal when the error detection result shows that an error is found in the received data, and generates an ACK signal as an ACK/NACK signal when no error is found in the received data. This ACK/NACK signal is outputted to modulating section 209.

Modulating section 209 modulates the ACK/NACK signal received from PDSCH receiving section 208 and outputs the modulated ACK/NACK signal to DFT section 211.

Modulating section 210 modulates transmission data (uplink data) and outputs the modulated data signal to DFT section 211.

DFT section 211 transforms the ACK/NACK signal received from modulating section 209 and the data signal received from modulating section 210 into frequency domain signals and outputs a plurality of frequency components obtained to mapping section 212.

Mapping section 212 maps a frequency component corresponding to the data signal out of the plurality of frequency components received from DFT section 211 to a PUSCH arranged on the uplink component carrier, according to the uplink resource assignment information received from PDCCH receiving section 207. Furthermore, mapping section 212 identifies the PUCCH according to the CCE number received from PDCCH receiving section 207. Mapping section 212 then maps a frequency component or code resource corresponding to the ACK/NACK signal out of the plurality of frequency components inputted from DFT section 211 to the PUCCH identified above. Modulating section 209, modulating section 210, DFT section 211 and mapping section 212 may also be provided for each component carrier.

IFFT section 213 transforms the plurality of frequency components mapped to the PUSCH into a time domain waveform and CP adding section 214 adds a CP to the time domain waveform.

RF transmitting section 215 is configured to be able to change a transmission band. RF transmitting section 215 sets the transmission band based on the band information received from setting information receiving section 206. RF transmitting section 215 applies transmission radio processing (up-conversion, digital/analog (D/A) conversion or the like) to a signal with a CP and transmits the signal via antenna 201.

[Operation of Base Station 100 and Terminal 200]

Figure 6:
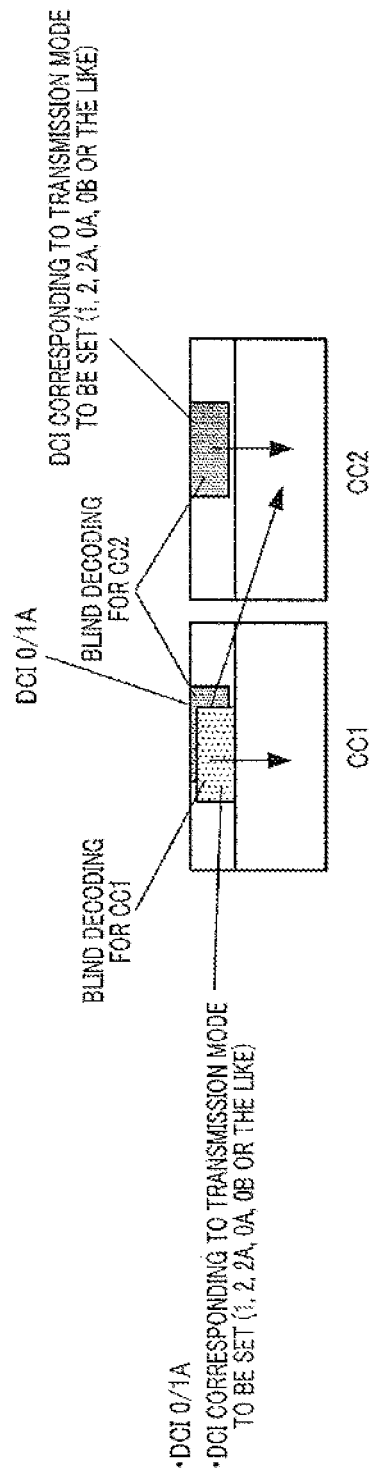
FIG. 6 is a diagram illustrating operation of the base station and terminal.

Operation of base station 100 and terminal 200 having the above-described configurations, respectively, will be described with reference to FIG. 6. For simplicity of description, a case will be described below where the number of downlink component carriers included in a UE CC set configured by base station 100, in terminal 200 is two, but the number of downlink component carriers is not limited to this.

In base station 100, CC setting section 101 sets two downlink component carriers (CC1, CC2) for terminal 200 (LTE-A terminal). Furthermore, CC setting section 101 sets CC1 as a PDCCH CC for CC1 and sets CC1 and CC2 as PDCCH CCs for CC2.

That is, of the two downlink component carriers included in the UE CC set configured for terminal 200, one PDCCH CC is associated with the first downlink component carrier (CC1) and a plurality of PDCCH CCs are associated with the second downlink component carrier (CC2). Here, one PDCCH CC associated with the first downlink component carrier (CC1) especially corresponds to the first downlink component carrier itself (CC1) and the plurality of PDCCH CCs associated with the second downlink component carrier (CC2) correspond to the second downlink component carrier itself (CC2) and the other downlink component carrier (CC1). That is, base station 100 can select any one of the plurality of CCs and transmit a PDCCH without additional information to be reported for CC2. Accordingly, setting of a plurality of PDCCH CCs for some of the plurality of downlink component carriers included in the UE CC set makes it possible to change the PDCCH CC for transmitting assignment information of the some downlink component carriers without RRC signaling. Furthermore, since one PDCCH CC is set for some other downlink component carriers, it is possible to suppress increase in the number of times blind decoding is performed on the receiving side of a PDCCH.

Furthermore, search space setting section 103 sets the search spaces (C-SS and UE-SS) shown in FIG. 4 for CC1 and CC2, respectively.

Assignment section 108 maps the PDCCH signal including assignment control information, based on the above-described mapping rules.

When assigning data to CC1 for terminal 200 through this mapping, base station 100 transmits a PDCCH signal using a C-SS or UE-SS of CC1.

Furthermore, when assigning data to CC2 for terminal 200 through this mapping, base station 100 transmits a PDCCH signal using a DE-SS of CC1 or C-SS or UE-SS of CC2. Here, when transmitting the PDCCH signal using the UE-SS of CC1, base station 100 uses a format (e.g., DCI 0/1A) common to all terminals as the format of assignment control information. On the other hand, when transmitting the PDCCH signal using the UE-SS of CC2, base station 100 uses a transmission mode dependent DCI format (e.g., DCI 1, 2, 2A, 0A, 0B) as the format of assignment control information. When transmitting the PDCCH signal using the C-SS of CC2, base station 100 uses a format (e.g., DCI 0/1A) common to alt terminals as the format of assignment control information.

By contrast, in the UE-SS of CC1, terminal 200 performs blind decoding on a total of four types of PDCCHs; PDCCH having a size of format common to all terminals for CC1, a PDCCH (two types for an uplink and downlink) having a size of DCI format corresponding to a transmission mode for CC1 and a PDCCH having a size of format common to all terminals for CC2.

Furthermore, in the C-SS of CC1, terminal 200 performs blind decoding on a PDCCH having a size of format common to all terminals for CC1 as in the case of the conventional art.

Furthermore, in the UE-SS of CC2, terminal 200 performs blind decoding on only a PDCCH having a size of DCI format corresponding to a transmission mode for CC2.

Furthermore, in the C-SS of CC2, terminal 200 performs blind decoding on a PDCCH having a size of format common to all terminals for CC2 as in the case of the conventional art. That is, of blind decoding on a PDCCH having a size of format common to all terminals and a PDCCH having a size of DCI format corresponding to the transmission mode conventionally performed in the UE-SS for CC2, terminal 200 performs blind decoding on a PDCCH having a size of format common to all terminals for CC1.

Summarizing the above-described blind decoding in terminal 200, the number of times terminal 200 performs blind decoding on PDCCHs including assignment control information of CC2 is as follows. That is, terminal 200 performs blind decoding a total of 60 times; 16 times for a format common to all terminals in the UE-SS of CC1, 32 times for a DCI format corresponding to the transmission mode in the UE-SS of CC2 (two types of an uplink and downlink) and 12 times for a format common to all terminals in the C-SS of CC2 and for DCI 1C. That is, this number of times is the same as the number of times blind decoding is performed when the blind decoding target component carrier is a first type component carrier.

Thus, according to the present embodiment, base station 100 transmits data to terminal 200 using a plurality of downlink component carriers. CC setting section 101 in base station 100 sets a control channel component carrier (PDCCH CC) for transmitting assignment information relating to data transmission resources of each downlink component carrier included in the UE CC set from among a plurality of downlink component carriers included in the UE CC set. To be more specific, CC setting section 101 associates one control channel component carrier (PDCCH CC) with the first downlink component carrier of the plurality of downlink component carriers included in the UE CC set and associates a plurality of control channel component carriers (PDCCH CCs) with the second downlink component carrier.

In this way, since a plurality of PDCCH CCs are set for some of the plurality of downlink component carriers included in the UE CC set, it is possible to flexibly change, without RRC signaling, a PDCCH CC for transmitting assignment information of the downlink component carriers in which PDCCH CCs are set. Furthermore, since one PDCCH CC is set for the other downlink component carriers, it is also possible to suppress increase in the number of times blind decoding is performed on the receiving side of a PDCCH.

Furthermore, in a first case where the above-described second downlink component carrier assignment information is a terminal-specific format, assignment section 108 performs mapping of the above-described second downlink component carrier as a control channel component carrier. In a second case where the second downlink component carrier assignment information is a common format common to all terminals, assignment section 108 performs mapping to a control channel component carrier different from the second downlink component carrier out of a plurality of control channel component carriers associated with the second downlink component carrier.

In this way, it is possible to change a control channel component carrier for mapping the second type component carrier assignment information according to whether the assignment information format is a terminal-specific format or a common format common to all terminals. Furthermore, setting the control channel component carrier to which assignment information is mapped in the above-described second case to be a first type component carrier can further suppress increase in the number of times blind decoding is performed on the receiving side of a PDCCH.

Here, applying the above-described PDCCH CC setting method and mapping rules to the following system will exert advantageous effects.

Figure 7:
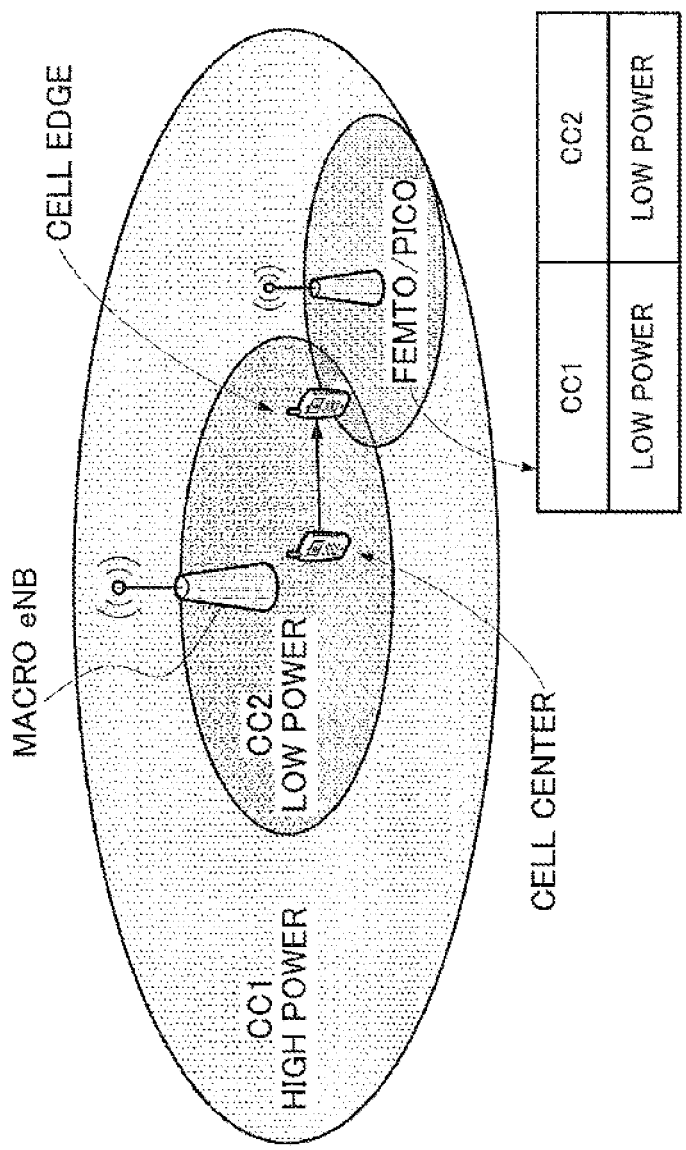
FIG. 7 is diagram illustrating a configuration of a heterogeneous network.

FIG. 7 is a diagram illustrating a configuration of a heterogeneous network. In FIG. 7, a macro cell and a femto cell (or pico cell) included in the macro cell are located in a heterogeneous network. Furthermore, a macro base station (Macro eNB) is configured to be able to use CC1 and CC2 for communication and can perform transmission with greater transmission power using CC1 than CC2. That is, the coverage of CC1 is greater than the coverage of CC2. Therefore, setting the coverage of CC2 outside the femto cell makes it possible to minimize interference with the femto cell from the macro cell. Here, base station 100 sets CC1 which has a sufficiently large coverage and which need not change a CC for transmitting a PDCCH from the same CC to be the first type component carrier, whereas base station 100 sets CC2 which has a small coverage and which needs to change a CC for transmitting a PDCCH to a different CC as the second type component carrier, and sets the PDCCH CC to CC1 and CC2.

When a terminal (UE) is located in a central part of the macro cell (that is, when an SINR of a transmission signal from the macro cell base station is high), receiving quality of a PDCCH is also high. Thus, even when the macro cell base station transmits a PDCCH from CC2, the terminal can receive the PDCCH at a sufficiently low error rate. Here, since the SINR is high in the central part of the cell, it is possible to select a transmission mode (e.g., MIMO) which does not have a high interference resilience but can realize high throughput transmission. Therefore, a DCI format corresponding to the transmission mode is more likely to be adopted, and according to the above-described mapping rules, data is more likely to be assigned using a PDCCH of CC2.

On the other hand, when the terminal is located at the cell edge of the macro cell (that is, the SINR of a transmission signal from the macro cell base station is low), the receiving quality of the PDCCH is also low. For this reason, even when the macro cell base station transmits a PDCCH from CC2, the terminal cannot receive at a sufficiently low error rate. Therefore, in this case, the macro cell base station needs to assign data using a PDCCH of CC1. Here, since the SINR is low at the cell edge, a more robust transmission method is more likely to be adopted. That is, the macro cell base station assigns data to the terminal at the cell edge using DCI 0/1A from CC1 and is thereby more likely to perform transmission using transmission diversity.

Therefore; the macro cell base station sets CC2 to the second type component carrier and uses the above-described mapping rules. In this way, the terminal which is the receiving side can monitor a DCI format which is more likely to be used when the terminal is located at the central part of the cell or at the cell edge, and it is less likely for the base station to encounter a situation where the base station cannot transmit a desired DCI format from a desired CC. That is, the probability of data assignment to the terminal being blocked is low. Furthermore, even when the terminal moves from the central part of the cell to the cell edge, the CC for transmitting a PDCCH can be changed from CC2 to CC1 (or change from CC1 to CC2 when the terminal moves from the cell edge to the central part of the cell) without RRC signaling for CC2.

Furthermore, assigning data to the terminal at the central part of the cell using a PDCCH of CC2 and assigning data to the terminal at the cell edge using a PDCCH of CC1 can achieve a load balance between PDCCHs, that is, uniformly map PDCCHs to the CCs. That is, it is possible to prevent PDCCHs from being concentrated to a particular CC, thus preventing the occurrence of a situation where PDCCHs cannot be transmitted within a limited region of PDCCH transmission resources initial three OFDM symbols). The present invention is also applicable to networks other than the heterogeneous network.

In the above description, a PDCCH for eel and a PDCCH for CC2 are transmitted with CC1, but an identical UE-SS or different UE-SSs may be set for both CC1 and CC2. When different UE-SSs are set, search space setting section 103 sets UE-SSs corresponding to the terminal ID and CC number. Setting different UE-SSs improves the degree of freedom of CCE assignment to two PDCCHs.

[Embodiment 2]

According to Embodiment 2, PDCCHs are mapped to different subsets in the first case and the second case. A search space specifically set for each terminal includes a plurality of subsets.

Basic configurations of a base station and a terminal according to Embodiment 2 are common to those of Embodiment 1, and will therefore be described using FIG. 3 and FIG. 5.

Figure 8:
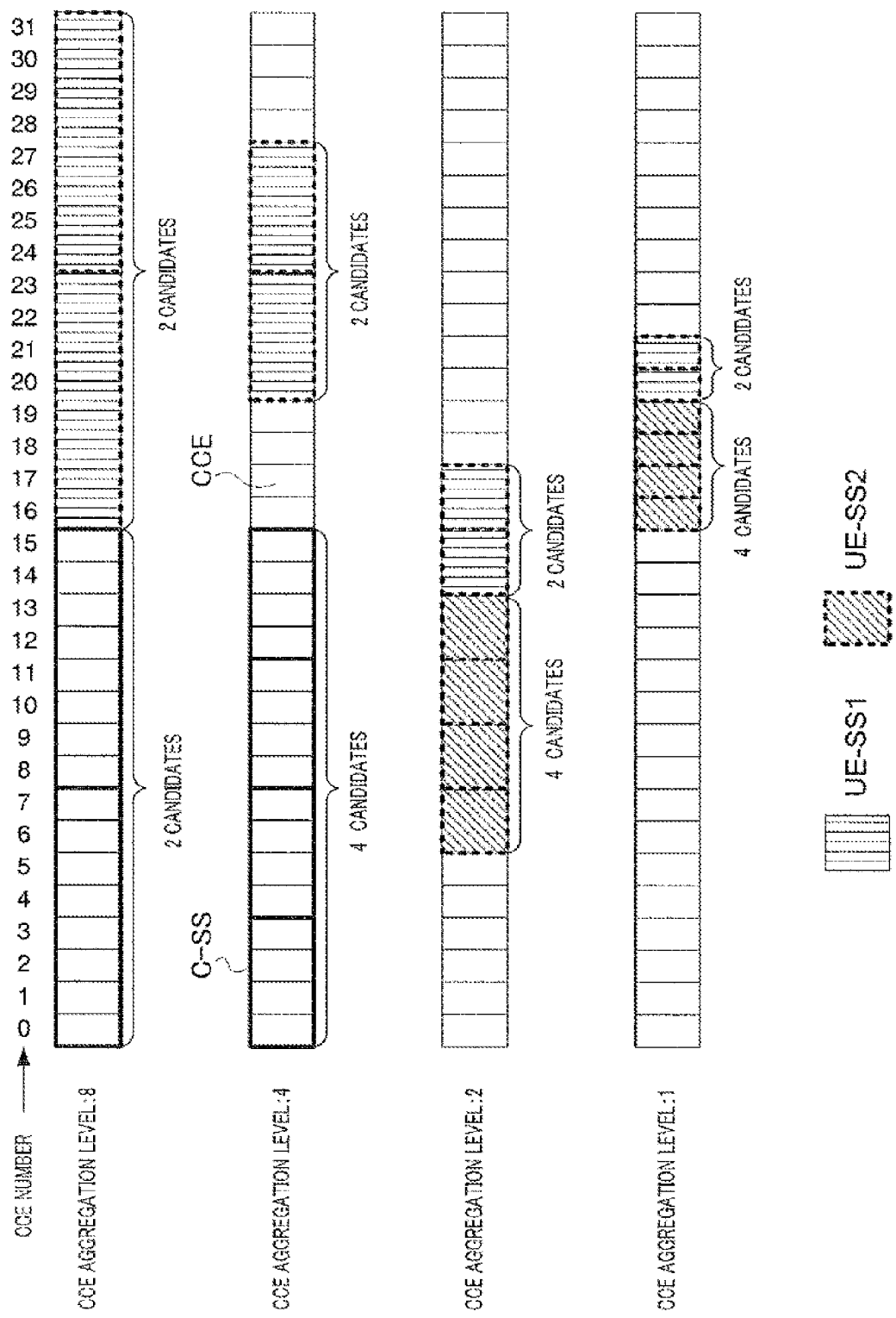
FIG. 8 is a diagram illustrating an example of setting C-SS and UE-SS for a certain terminal according to Embodiment 2 of the present invention.

In base station 100 of Embodiment 2, search space setting section 103 sets N (N is a natural number equal to or greater than 2) subsets obtained by dividing a UE-SS (UE-SS0) in each PDCCH CC of the second type component carrier into N portions. N corresponds to the number of PDCCH CCs set to the second typo component carrier. That is, a subset example shown in FIG. 8 shows a case where the number of PDCCH CCs set to the second type component carrier is two.

When mapping PDCCH signals to a UE-SS in a plurality of PDCCH CCs associated with one second type component carrier, assignment section 108 maps the PDCCH signals to different subsets.

In terminal 200 of Embodiment 2, when a blind decoding target component carrier is a first type component carrier, PDCCH receiving section 207 performs blind decoding on each blind decoding region candidate in the calculated UE-SS.

Furthermore, when the blind decoding target component carrier is a second type component carrier, PDCCH receiving section 207 performs blind decoding on each blind decoding region candidate in one of the plurality of subsets in the calculated UE-SS.

Figure 9:
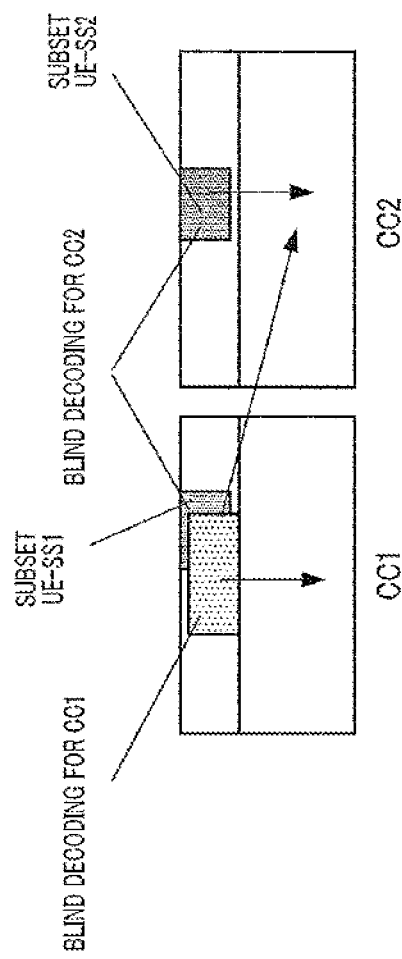
FIG. 9 is a diagram illustrating operation of a base station and terminal according to Embodiment 2 of the present invention.

Operation of base station 100 and terminal 200 having the above configurations, respectively, will be described with reference to FIG. 9. For simplicity of explanation, a case will be described below where the number of downlink component carriers included in a UE CC set that base station 100 sets for terminal 200 is two, but the number of downlink component carriers is no limited to this.

In base station 100, search space setting section 103 sets two subsets (UE-SS1 and UE-SS2) obtained by dividing a UE-SS (UE-SS0) into PDCCH CCs (CC1 and CC2) of CC2 which is a second type component carrier.

When mapping PDCCH signals to the UE-SS in CC1 and CC2 which are PDCCH CCs of CC2, assignment section 108 maps the PDCCH signals to different subsets. Here, a PDCCH signal is mapped to UE-SS1 in CC1 and another PDCCH signal is mapped to UE-SS2 in CC2.

Here, in the example of setting search spaces in FIG. 8, six PDCCH assignment region candidates (that is, CCE16 to 21) are set as a UE-SS for CCE aggregation level 1. On the other hand, six PDCCH assignment region candidates (that is, CCE6 to 17 are divided into sets of two CCEs) are set as the UE-SS for CCE aggregation level 2. Furthermore, two PDCCH assignment region candidates (that is, CCE20 to 23, CCE24 to 27) are set as the UE-SS for CCE aggregation level 4. Furthermore, two PDCCH assignment region candidates (that is, CCE16 to 23, CCE24 to 31) are set as the UE-SS for CCE aggregation level 8. That is, in FIG. 8 a total of 16 PDCCH assignment region candidates are set as the UE-SS.

Furthermore, in FIG. 8, UE-SS1 and UE-SS2 are each set as the UE-SS. UE-SS1 has a total of eight PDCCH assignment region candidates; two PDCCH assignment region candidates for each of CCE aggregation level 1, CCE aggregation level 2, CCE aggregation level 4 and CCE aggregation level 8. On the other hand, UE-SS2 has a total of eight PDCCH assignment region candidates; four PDCCH assignment region candidates for each of CCE aggregation level 1l and CCE aggregation level 2.

By contrast, when blind-decoding PDCCHs to be assigned to CC2, terminal 200 blind-decodes UE-SS1 in CC1 and blind-decodes UE-SS1 and a C-SS in CC2. Here, terminal 200 blind-decodes a format (e.g., DCI 0/1A) common to all terminals and a DCI format (uplink and downlink) corresponding to the transmission mode in all search spaces.

Summarizing the above-described blind decoding in terminal 200, the number of times terminal 200 performs blind decoding on PDCCHs including assignment control information of CC2 is as follows. That is, blind decoding is performed a total of 60 times including: a total of 24 times for the UE-SS in CC1, i.e., 8 times for a format common to all terminals and 16 times for a DCI format (two types of uplink and downlink) corresponding to the transmission mode; a total of 24 times for the UE-SS in CC2, i.e., 8 times for a format common to all terminals and 16 times for a DCI format (two types of uplink and downlink) corresponding to the transmission mode; and 12 times for the C-SS in CC2 for a format common to all terminals and for DCI 1C. That is, this number of times is equal to the number of times blind decoding is performed when the blind decoding target component carrier is the first type component carrier.

As described above, according to the present embodiment, base station 100 transmits data to terminal 200 using a plurality of downlink component carriers as in the case of Embodiment 1. In base station 100, CC setting section 101 sets a control channel component carrier (PDCCH CC) for transmitting assignment information relating to data transmission resources of each downlink component carrier included in the UE CC set from among a plurality of downlink component carriers included in the UE CC set. To be more specific, of the plurality of downlink component carriers included in the UE CC set, CC setting section 101 associates one control channel component carrier (PDCCH CC) with the first downlink component carrier and associates a plurality of control channel component carriers (PDCCH CCs) with the second downlink component carrier.

In this way, since a plurality of PDCCH CCs are set for some of the plurality of downlink component carriers included in the UE CC set, it is possible to flexibly change PDCCH CCs for transmitting assignment information of the some downlink component carriers without RRC signaling. Furthermore, since one PDCCH CC is set for some other downlink component carriers, it is also possible to suppress increase in the number of times blind decoding is performed on the receiving side of a PDCCH.

Furthermore, in the first case where the above-described second downlink component carrier assignment information is a terminal-specific format, assignment section 108 maps the above-described second downlink component carrier as a control channel component carrier. In the second case where the second downlink component carrier assignment information is a common format common to all terminals, assignment section 108 maps the second downlink component carrier to a control channel component carrier which is different from the second downlink component carrier out of the plurality of control channel component carriers associated with the second downlink component carrier.

In the above-described example of setting search spaces in FIG. 8, only part of the PDCCH assignment region candidate group corresponding to the CCE aggregation level equal to or below a reference level (here, CCE aggregation level=2) is assigned to UE-SS1 to which a PDCCH signal is mapped in the above-described second case and the rest of the PDCCH assignment region candidate group is assigned to UE-SS2 to which the PDCCH signal is mapped in the above-described first case.

Applying the above-described PDCCH CC setting method and mapping rules to the system shown in FIG. 7 exerts advantageous effects.

In a heterogeneous network, when a terminal (UE) is located at a central part of a macro cell (that is, when an SINR of a transmission signal from a macro cell base station is high), receiving quality of a PDCCH is also high. For this reason, when the macro cell base station transmits a PDCCH from CC2 at a lower CCE aggregation level (that is, at a lower coding rate), the terminal can receive the PDCCH signal at a desired error rate. Therefore, even when PDCCH assignment region candidates of UE-SS2 to which the PDCCH signal is mapped in the above-described first case are limited only to a low CCE aggregation level (that is, 1 CCE and 2 CCEs), the macro cell base station can assign PDCCH flexibly enough.

On the other hand, when the macro cell base station needs to transmit a PDCCH from CC1, the SINR is low in many cases, for example, when the terminal is located at the cell edge of the macro cell. At this time, if the number of PDCCH assignment region candidates corresponding to a high CCE aggregation level is set to a level equivalent to that of LTE in UE-SS1 to which a PDCCH signal is mapped in the above-described second case, the macro cell base station can assign the PDCCH flexibly enough even if the number of PDCCH assignment region candidates corresponding to the low CCE aggregation level is reduced.

On the other hand, when CC2 requires a higher CCE aggregation level, transmission from CC1 can realize highly reliable transmission at a lower CCE aggregation level. For this reason, PDCCHs at a low CCE aggregation level can also be blind decoding candidates in CM.

Thus, the number of times blind decoding is performed at a high CCE aggregation level which is more likely to be used is set to a sufficient number, and the number of times blind decoding is performed at other CCE aggregation levels is reduced. Thus, PDCCH transmission from a plurality of component carriers is made possible without losing PDCCH assignment flexibility.

Furthermore, the UE-SS is similar to one defined in LTE. Since this UE-SS is divided and the resulting portions of the UE-SS are set as subsets, terminal 200 may blind-decode the same blind decoding region candidates as those of the first type component carrier. Therefore, the design of terminal 200 becomes simple. Furthermore, when a UE-SS of LTE is calculated from a terminal ID or the like, subsets are also implicitly calculated. This eliminates the necessity for setting any additional search space and can further simplify base station 100 and terminal 200.

Here, subsets may also be set as follows.

(1) For example, in UE-SS1, 0, 0, 4 and 4 PDCCH assignment region candidates may be set for CCE aggregation level 1, CCE aggregation level 2, CCE aggregation level 4 and CCE aggregation level 8 respectively, and 4, 4, 0 and 0 PDCCH assignment region candidates may be set in UE-SS2. In this case, UE-SS1 includes more PDCCH assignment region candidates corresponding to a higher CCE aggregation level. Therefore, when the macro cell base station transmits PDCCHs from CC1 (that is, when transmitting PDCCHs to a terminal located at the cell edge), it is possible to improve the flexibility of PDCCH assignment.

(2) On the other hand, in an environment with many users, transmitting PDCCHs of both CC1 and CC2 from CC1 to all terminals at the cell edge may cause CC1 to run short of PDCCHs. For this reason, it is necessary to allow transmission of a sufficient number of PDCCHs from CC2 to terminals located at the cell edge to a certain degree. Therefore, the number of PDCCH assignment region candidates may be increased for a lower CCE aggregation level in UE-SS1 and the number of PDCCH assignment region candidates may be increased for a higher CCE aggregation level in UE-SS2. For example, 6, 4, 0 and 0 PDCCH assignment region candidates may be set for CCE aggregation level 1, CCE aggregation level 2, CCE aggregation level 4 and CCE aggregation level 8 respectively in UE-SS1, and 0, 2, 2 and 2 PDCCH assignment region candidates may be set in UE-SS2.

(3) Furthermore, a subset configuration set for each of CC1 and CC2 (that is, the number of PDCCH assignment region candidates associated with each CCE aggregation level) may be made settable (configurable) according to an operation scenario. In this case, the subset configuration may be broadcasted for each cell as control information of a higher layer as broadcast information or may be specifically set and reported for each terminal.

[Embodiment 3]

Embodiment 3 will apply a mapping rule different from that of Embodiment 1.

Since basic configurations of a base station and a terminal according to Embodiment 3 are common to those of Embodiment 1, those configurations will be described using FIG. 3 and FIG. 5.

In base station 100 of Embodiment 3, assignment section 108 maps PDCCH signals including assignment control information according to mapping rule 2.

To be more specific, above-described mapping rule 2 is as follows.

(1) When a target component carrier to which resources are assigned according to assignment control information for terminal-specific data assignment included in mapping target PDCCH signals is a second type component carrier and the format of the assignment control information is a transmission mode dependent DCI format (e.g., DCI 1, 2, 2A, 0A, 0B):

In this case, PDCCH signals are mapped to a UE-SS set for an assignment target terminal in the target component carrier.

(2) In a case where a target component carrier to which resources are assigned according to assignment control information for terminal-specific data assignment included in mapping target PDCCH signals is a second type component carrier and the format of the assignment control information is a second type component carrier and the format of the assignment control information is a format (e.g., DCI 0/1A) common to all terminals: in a PDCCH CC set for the target component carrier, PDCCH signals are mapped to a UE-SS set for an assignment target terminal or a C-SS of the target component carrier. Furthermore, assignment section 108 includes a padding section, and when mapping the PDCCH signal to a PDCCH CC which is different from the target component carrier, assignment section 108 performs padding for assignment control information included in the PDCCH signal, that is, insertion of known bits. This causes the padded assignment control information to have the same size as the format common to all, terminals when the first type component carrier is a target component carrier.

In terminal 200 of Embodiment 3, PDCCH receiving section 207 performs blind decoding processing in the downlink component carrier unit included in the UE CC set configured in its own terminal (that is, data assignment target component carrier unit).

At this time, as described above, the assignment control information in the formal common to all terminals relating to the first type component carrier and the assignment control information in the format common to all terminals relating to the second type component carrier are made to have the same size through padding in the first type component carrier. This makes it possible to suppress increase in the number of times blind decoding is performed in terminal 200.

Figure 10:
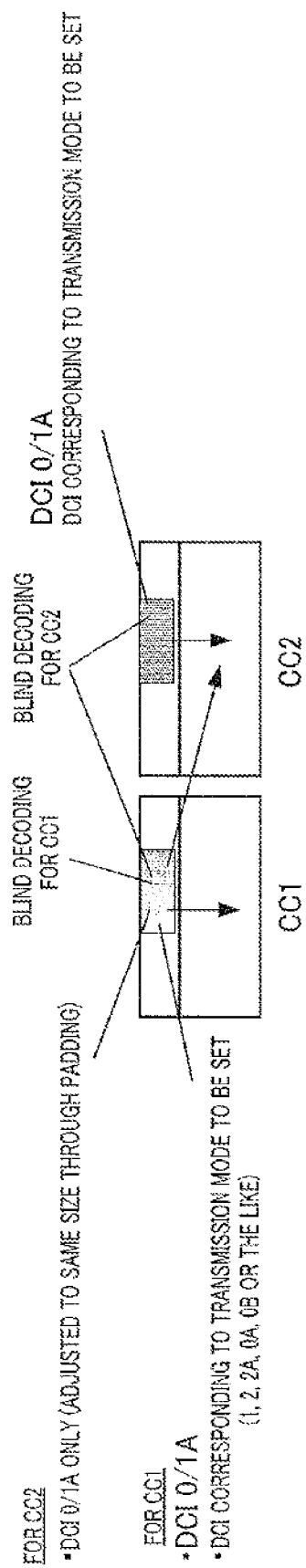
FIG. 10 is a diagram illustrating operation base station and terminal according to Embodiment 3 of the present invention.

Operation of base station 100 and terminal 200 having the above-described configurations will be described with reference to FIG. 10. For simplicity of explanation, a case will be described below where the number of downlink component carriers included in the UE CC set that base station 100 sets in terminal 200 is two, but the number of downlink component carriers is not limited to this.

In base station 100, CC setting section 101 sets two downlink component carriers (CC1, CC2) in terminal 200 (LTE-A terminal). Furthermore, CC setting section 101 sets CC1 as a PDCCH CC for CC1 and sets CC1 and CC2 as PDCCH CCs for CC2.

That is, of the two downlink component carriers included in the UE CC set configured for terminal 200, one PDCCH CC is associated with the first downlink component carrier (CC1) and a plurality of PDCCH CCs are associated with the second downlink component carrier (CC2).

Assignment section 108 maps the PDCCH signal including assignment control information based on above-described mapping rule 2.

When assigning data to CC2 for terminal 200 through this mapping and transmitting the PDCCH signal using the UE-SS of CC2, base station 100 uses a DCI format corresponding to the transmission mode or a format common to all terminals.

Furthermore, when assigning data to CC2 for terminal 200 through this mapping and transmitting the PDCCH signal using the UE-SS of CC1, base station 100 uses a format common to all terminals. Furthermore, base station 100 applies padding to the format common to all terminals used for data transmission resource assignment control information of CC2 so that the format has the same size as the format common to all terminals used for data transmission resource assignment control information of CC1. For example, when the bandwidth of CC1 is greater than the bandwidth of CC2, CC1 has a greater size of DCI 0/1A than CC2. In this case, padding is applied to DCI 0/1A of CC2 so that DCI 0/1A of CC2 has the same size. In the opposite case, padding is likewise applied to DCI 0/1A of CC1.

In contrast, at the time of blind decoding on DCI 0/1A performed with the UE-SS of CC1, terminal 200 can also simultaneously detect a PDCCH whose format is DCI 0/1A of CC2. For this reason, the number of times blind decoding is performed does not increase compared to that in Embodiment 1.

Summarizing the above-described blind decoding in terminal 200, the number of times blind decoding is performed by terminal 200 on a PDCCH including CC2 assignment control information is as follows. That is, blind decoding is performed a total of 60 times: a total of 48 times for the format common to all terminals and for the DCI format (two types of uplink and downlink) corresponding to the transmission mode in the UE-SS of CC2; and a total of 12 times for the format common to all terminals and for DCI 1C in the C-SS of CC2. That is, this number of times is the same as the number of times blind decoding is performed when the blind decoding target component carrier is a first type component carrier.

Thus, as in the ease of Embodiment 1, a plurality of PDCCH CCs are set for some (here, C2) of the plurality of downlink component carriers included in the UE CC set. It is thereby possible to flexibly change the PDCCH CC for transmitting the assignment information of the some downlink component carriers without RRC signaling. Furthermore, since one PDCCH CC is set for some other downlink component carriers (here, CC1), it is possible to suppress increase in the number of times blind decoding is performed on the receiving side of a PDCCH.

Furthermore, as in the case of Embodiment 1, reporting relating to data assignment to CC2 using a PDCCH of CC1 is mainly used to perform data assignment to a terminal at the cell edge. For this reason, it is sufficient that DCI 0/1A used for assignment of data transmission can be used when a default mode (that is, a robust transmission mode) is applied. That is, even if the DCI format corresponding to the transmission mode set for the terminal cannot be transmitted, the influence thereof is small.

To avoid increase of overhead due to the above-described padding, it is also possible to transmit. DCI 0/1A from CC1 only when the bandwidth of CC1 is greater than that of CC2.

[Other Embodiments]

Tyr the above-described embodiments CC setting section 101 sets PDCCH CCs to CC1 and CC2 for CC2. In contrast, for example, it may also be possible to set PDCCH CCs of CC2 to CC2 for a terminal at the central part of the cell that hardly moves, set PDCCH CCs of CC2 to CC1 for a terminal at the cell edge that hardly moves and set CC1 and CC2 as PDCCH CCs for CC2 only for a terminal that is moving fast. In this case, it is possible to transmit a DCI 0/1A and DCI format corresponding to the transmission mode for each terminal 200 that hardly moves from a CC which is more suitable for PDCCH transmission and prevent concentration of PDCCH transmission from CC1. That is, by making the number of PDCCH CCs selectable for each CC, it is possible to achieve load balance between PDCCHs.

(2) In the above-described embodiments, it is also possible to set whether or not to enable a PDCCH to be transmitted to report different CCs for each CC. That is, it is also possible to set whether or not to transmit a PDCCH including a CI (carrier indicator) for each CC. It is also possible to control the number of PDCCH CCs using this CC setting capable of reporting different CCs. That is, in the above description, when a setting is made such that different CCs cannot be reported to CC1 and CC2, a PDCCH CC is set to itself (that is, an identical CC) for both CCs. On the other hand, when a setting is made such that CC1 is set to be able to report different CCs and CC2 is set to be unable to report different CCs, a PDCCH CC of CC1 is set to CC1 and a PDCCH CC of CC2 is set to CC1 and CC2. Alternatively, when a further different CC (CC3) exists, it is also possible to set CC2 to be able to report different CCs, and to assign no CI value to CC1 so that the PDCCH CC for CC1 can be set to only CC1. In this case, the PDCCH CC of each CC can be set depending on whether or not to include a C1 or whether or not to assign the CI value to each CC, which makes it possible to simplify control.

(3) In the above-described embodiments, an anchor CC (anchor carrier, special carrier or primary carrier) may be set to be a first type component carrier and other CCs may be set to be second type component carriers. In this case, a terminal which is the receiving side of a PDCCH monitors all DCI formats (DCI 0/1A and DCI corresponding to the transmission mode) for one CC in the anchor CC using all PDCCH assignment region candidates of a search space. For this reason, the anchor CC can perform stable communication through more robust PDCCH assignment.

Regarding the anchor CC, in an out-of-synchronization condition with no PDCCH arriving at the terminal through the CC, the anchor CC is defined as a CC for which it is necessary to reset (reestablish the RRC connection) the connection itself between the base station and the terminal. Furthermore, the anchor CC may also be defined as a CC for transmitting an ACK/NACK signal, scheduling request signal or CQI over an uplink. Furthermore, for the anchor CC, one determined in the system (e.g., CC for transmitting an SCH or PBCH) may be defined or one common among terminals may be set for each cell or different anchor CCs may be set for different terminals.

(4) In the above-described embodiments, two or more CCs may be set as PDCCH transmission CCs. However, in a heterogeneous network, since it is sufficient that a PDCCH can be transmitted with one CC having high transmission power and a CC to which data is assigned, the number of CCs may be limited to two. Limiting the number of CCs to one or two enables a simpler setting.

(5) In the above-described embodiments, for the uplink data assignment target CC, that is, PUSCH CC, a PDCCH CC may be set in addition to the PDSCH CC which is an uplink data assignment target CC. This improves the flexibility.

(6) in the above-described embodiments, to reduce the number of times blind decoding is performed, for a C-SS, the terminal may be configured so as to blind-decode only a C-SS of one CC (e.g., anchor CC).

(7) The above-described carrier aggregation may also be called "band aggregation." Furthermore, non-contiguous bands may also be linked together in carrier aggregation.

(8) C-RNTI (cell-radio network temporary identifier) may be used for the terminal ID in the above-described embodiments.

(9) The above-described "component carrier" is a band having a width of maximum 20 MHz and defined as a base unit of communication bands, but may also be defined as follows. A "component carrier" on a downlink (hereinafter referred to as "downlink component carrier") may be defined as a band divided by downlink frequency band information in a BCH broadcasted from the base station or a band defined by a distribution width when a downlink control channel (physical downlink control channel: PDCCH) is distributed and arranged. Furthermore, the "component carrier" on an uplink (hereinafter referred to as "uplink component carrier") may be defined as a hand divided by uplink frequency band information in a BCH broadcasted from the base station or a band defined as a base unit of communication hand of 20 MHz or below including a PUSCH near the center and including PUCCHs at both ends. Furthermore, in 3GPP LTE, the "component carrier" may be expressed as Component Carrier(s) in English. The "component carrier" may also be called "unit band." Furthermore, the "component carrier" may also be defined by a physical cell number and carrier frequency number, and may be called "cell." Furthermore, in the above embodiments, the component carrier mainly used in a macro cell base station (e.g., CC1 which is a first type component carrier) may be called "primary cell (PCell)" and other component carriers (e.g., CC2 which is a second type component carrier) may be called "secondary cell (SCell),"

(10) The expression "DCI format common to all terminals" in the above embodiments may also be read as a "DCI format independent of a transmission mode,"

(11) In the above-described embodiments, a format independent of a terminal transmission mode has been described as "DCI 0/1A," but the format is not limited to this and any format may be adopted as long as it is usable regardless of the terminal transmission mode. Furthermore, formats other than DCI 1, 2, 2A, 2B, 2C, 2D, 0A and 0B may be used as the transmission mode dependent DCI. Furthermore, contiguous band assignment transmission may also be included as an uplink or downlink transmission mode. For a terminal for which this transmission mode is set, the transmission mode dependent DCI is DCI 0 (uplink) and DCI 1A (downlink). In this case, since the DCI format common to all terminals and the transmission mode dependent format are the same, blind decoding may be performed in a UE-SS using one type of format for each of the uplink and downlink as targets. When contiguous band assignment is applied to both the uplink and downlink, one type format is used as a whole. Setting DCI 0/1A to a transmission mode dependent DCI having a wider search space makes it possible to prevent increase in the block rate for a terminal to which PDCCHs can be assigned using only DCI 0/1A because its propagation path condition is originally poor.

(12) CCs set for each terminal may be set independently between the uplink and downlink. A set of CCs set for the uplink may be called "UE UL component carrier set" and a set of CCs set for the downlink may be called "UE DL component carrier set" or the like.

(13) Although the explanation is given using an antenna in the aforementioned embodiments, the present invention may be similarly applied to an antenna port. The antenna port refers to a logical antenna including a single or a plurality of physical antenna(s). That is, the antenna port is not limited to a single physical antenna, but may refer to an antenna array including a plurality of antennas, or the like. For example, in 3 GPP LTE, how many physical antennas are included in the antenna port is not specified, but the antenna port is specified as the minimum unit allowing the base station to transmit different reference signals. In addition, the antenna port may be specified as a minimum unit for multiplying a weight of the pre-coding vector.

(14) Also, although the above embodiments are described as examples where the present invention is configured by hardware, the present invention can also be realized by software. Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration. Further, the method of circuit integration is not limited to ESI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible. Further, if integrated circuit technology comes out to replace LSI's as a result of the advancement of semiconductor technology or a derivative of other technology, it is naturally also possible to carry out function block integration using this technology. Application of biotechnology is also possible.

The disclosure of Japanese Patent Application No. 2010-064431, filed on Mar. 19, 2010, including the specification, drawings and abstract is incorporated herein by reference in its entirety.

INDUSTRIAL APPLICABILITY

The base station and transmission method of the present invention do not require signaling in a higher layer in changing a PDCCH CC even in a ease where cross-carrier scheduling is adopted. The base station and transmission method of the present invention thus are useful as ones that are capable of suppressing increase in the number of times blind decoding is performed on the receiving side of a PDCCH.

REFERENCE SIGNS LIST 100 base station
101 CC setting section
102 control section
103 search space setting section
104 PDCCH generating section
105, 106, 107 coding/modulating section
108 assignment section
109 multiplexing section
110, 213 IFFT section
111, 214 CP adding section
112, 215 RF transmitting section
113, 201 antenna
114, 202 RF receiving section
115, 203 CP removing section
116, 204 FFT section
117 extracting section
118 IDFT section
119 data receiving section
120 ACK/NACK receiving section
200 terminal
205 demultiplexing section
206 setting information receiving section
207 PDCCH receiving section
208 PDSCH receiving section
209, 210 modulating section
211 DFT section
212 mapping section

The invention claimed is:

1. A base station that transmits data to a terminal using a plurality of downlink component carriers, the base station comprising:
    a component carrier setting section that sets the plurality of downlink component carriers for the terminal and sets control channel component carriers for transmitting assignment information relating to data transmission resources of each downlink component carrier from among the plurality of downlink component carriers, wherein the component carrier setting section associates one of the control channel component carriers only with a first downlink component carrier among the plurality of downlink component carriers and associates a plurality of the control channel component carriers with a second downlink component carrier among the plurality of downlink component carriers; and
    a transmitting section that transmits the data and the assignment information, using the plurality of downlink component carriers and the control channel component carriers set by the component carrier setting section, wherein
    the component carrier setting section uses at least one selection criteria for setting the first and second downlink component carriers, wherein any of the following sets of selection criteria (1) to (5) for setting the first and second downlink component carriers are used:
    (1) the first downlink component carrier has a better average channel situation over a long time than the second downlink component carrier;
    (2) the first downlink component carrier has a better channel quality than the second downlink component carrier;
    (3) the first downlink component carrier has a higher transmission power than the second downlink component carrier;
    (4) the first downlink component carrier receives a smaller other cell interference than the second downlink component carrier; and
    (5) the first downlink component carrier itself is selected as an only PDCCH component carrier, and the second downlink component carrier itself and a component carrier having a greater transmission power are selected as PDCCH component carriers.

2. The base station according to claim 1, further comprising:
a generating section that generates the assignment information using a format corresponding to a transmission mode set in the resource assignment target component carrier;
and a mapping section that maps the generated assignment information to a control channel component carrier corresponding to the format, wherein mapping section maps the assignment information to the second downlink component carrier in a first case where the assignment information of the second downlink component carrier is a terminal-specific format and maps the assignment information to a control channel component carrier different from the second downlink component carrier from among the plurality of control channel component carriers associated with the second downlink component carrier in a second case where the assignment information of the second downlink component carrier is a common format common to all terminals.

3. The base station according to claim 1, wherein the one control channel component carrier associated with the first downlink component carrier is the first downlink component carrier, and the plurality of control channel component carriers associated with the second downlink component carrier are the second downlink component carrier and downlink component carriers other than the second downlink component carrier.

4. The base station according to claim 2, further comprising a search space setting section that sets a search space specifically set for each terminal in each downlink component carrier, the search space set in each downlink component carrier, comprising a plurality of subsets, wherein the mapping section maps the assignment information corresponding to the second downlink component carrier to different subsets of the plurality of control channel component carriers.

5. A base station that transmits data to a terminal using a plurality of downlink component carriers, the base station comprising:
a component carrier setting section that sets the plurality of downlink component carriers for the terminal and sets control channel component carriers for transmitting assignment information relating to data transmission resources of each downlink component carrier from among the plurality of downlink component carriers, wherein the component carrier setting section associates one of the control channel component carriers only with a first downlink component carrier among the plurality of downlink component carriers and associates a plurality of the control channel component carriers with a second downlink component carrier among the plurality of downlink component carriers;
a transmitting section that transmits the data and the assignment information, using the plurality of downlink component carriers and the control channel component carriers set by the component carrier setting section;
a generating section that generates assignment information using a format corresponding to a transmission mode set in the resource assignment target component carrier; and
a padding section that performs padding of the assignment information of the second downlink component carrier until the assignment information of the second downlink component carrier has the same size as assignment information having a common format of the first downlink component carrier, in a case where the assignment information of the second downlink component carrier is a common format common to all terminals and mapping is performed to a control channel component carrier different from the second downlink component carrier from among the plurality of control channel component carriers associated with the second downlink component carrier.

6. A transmission method for transmitting data to a terminal using a plurality of downlink component carriers, the method comprising:
setting the plurality of downlink component carriers for the terminal and setting control channel component carriers for transmitting assignment information relating to data transmission resources of each downlink component carrier from among the plurality of downlink component carriers, wherein one of the control channel component carriers is associated only with a first downlink component carrier among the plurality of downlink component carriers and a plurality of the control channel component carriers are associated with a second downlink component carrier among the plurality of downlink component carriers; and
transmitting the data and the assignment information using the set plurality of downlink component carriers and the set control channel component carriers, wherein
the setting step uses at least one selection criteria for setting the first and second downlink component carriers. wherein any of the following sets of selection criteria (1) to (5) for setting the first and second downlink component carriers are used:
(1) the first downlink component carrier has a better average channel situation over a long time than the second downlink component carrier;
(2) the first downlink component carrier has a better channel quality than the second downlink component carrier;
(3) the first downlink component carrier has a higher transmission power than the second downlink component carrier;
(4) the first downlink component carrier receives a smaller other cell interference than the second downlink component carrier; and
(5) the first downlink component carrier itself is selected as an only PDCCH component carrier, and the second downlink component carrier itself and a component carrier having a greater transmission power are selected as PDCCH component carriers.

7. The transmission method according to claim 6, further comprising:
generating the assignment information using a format corresponding to a transmission mode set in the resource assignment target component carrier; and
mapping the generated assignment information to a control channel component carrier corresponding to the format, wherein mapping section maps the assignment information to the second downlink component carrier in a first case where the assignment information of the second downlink component carrier is a terminal-specific format and maps the assignment information to a control channel component carrier different from the second downlink component carrier from among the plurality of control channel component carriers associated with the second downlink component carrier in a second case where the assignment information of the second downlink component carrier is a common format common to all terminals.

8. The transmission method according to claim 6, wherein the one control channel component carrier associated with the first downlink component carrier is the first downlink component carrier, and the plurality of control channel component carriers associated with the second downlink component carrier are the second downlink component carrier and downlink component carriers other than the second downlink component carrier.

9. The transmission method according to claim 7, further comprising setting a search space specifically set for each terminal in each downlink component carrier, the search space set in each downlink component carrier, comprising a plurality of subsets, wherein the step of mapping the assignment information corresponding to the second downlink component carrier to different subsets of the plurality of control channel component carriers.

10. The transmission method according to claim 6, further comprising:

generating assignment information using a format corresponding to a transmission mode set in the resource assignment target component carrier; and padding of the assignment information of the second downlink component carrier until the assignment information of the second downlink component carrier has the same size as assignment information having a common format of the first downlink component carrier, in a case where the assignment information of the second downlink component carrier is a common format common to all terminals and mapping is performed to a control channel component carrier different from the second downlink component carrier from among the plurality of control channel component carriers associated with the second downlink component carrier.

* * * * *